United States Patent
Suzuki et al.

(10) Patent No.: US 10,341,974 B2
(45) Date of Patent: *Jul. 2, 2019

(54) USING A CELL AS A PATHLOSS OR TIMING REFERENCE

(71) Applicant: BlackBerry Limited, Waterloo (CA)

(72) Inventors: Takashi Suzuki, Ichikawa (JP); Zhijun Cai, Euless, TX (US); Rene Waraputra Purnadi, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 29 days.

This patent is subject to a terminal disclaimer.

(21) Appl. No.: 15/825,149

(22) Filed: Nov. 29, 2017

(65) Prior Publication Data

US 2018/0084514 A1     Mar. 22, 2018

Related U.S. Application Data

(63) Continuation of application No. 14/828,859, filed on Aug. 18, 2015, now Pat. No. 9,838,989, which is a continuation of application No. 13/655,797, filed on Oct. 19, 2012, now Pat. No. 9,131,434.

(51) Int. Cl.
H04W 56/00   (2009.01)
H04W 76/28   (2018.01)

(52) U.S. Cl.
CPC ....... *H04W 56/0015* (2013.01); *H04W 56/00* (2013.01); *H04W 76/28* (2018.02)

(58) Field of Classification Search
CPC .. H04W 56/0015; H04W 76/28; H04W 56/00
See application file for complete search history.

(56) References Cited

U.S. PATENT DOCUMENTS

| | | | |
|---|---|---|---|
| 9,131,434 B2 * | 9/2015 | Suzuki | H04W 56/00 |
| 9,838,989 B2 * | 12/2017 | Suzuki | H04W 56/00 |
| 2010/0130218 A1 | 5/2010 | Zhang | |
| 2010/0272017 A1 | 10/2010 | Terry | |
| 2012/0250520 A1 | 10/2012 | Chen et al. | |
| 2012/0281548 A1 * | 11/2012 | Lin | H04W 76/18 370/242 |

(Continued)

FOREIGN PATENT DOCUMENTS

| | | |
|---|---|---|
| CN | 101771438 A | 7/2010 |
| WO | 2010105148 A1 | 9/2010 |
| WO | 2014029095 | 2/2014 |

OTHER PUBLICATIONS

3GPP TS 36.213 V10.6.0, Technical Specification, 3rd Generation Partnership Project, Technical Specification Group Radio Access Network, Evolved Universal Terrestrial Radio Access (E-UTRA), Physical layer procedures (Release 10), Jun. 2012 (125 pages).

(Continued)

*Primary Examiner* — Walli Z Butt
(74) *Attorney, Agent, or Firm* — Trop, Pruner & Hu, P.C.

(57) ABSTRACT

Information is communicated indicating whether a cell on a first carrier of a first type is to be used as a reference cell, wherein the reference cell is at least one selected from among a pathloss reference cell and a timing reference cell, and wherein the first carrier of the first type is part of a carrier aggregation that further includes at least a second carrier of a second, different type.

17 Claims, 9 Drawing Sheets

(56) References Cited

U.S. PATENT DOCUMENTS

| | | | |
|---|---|---|---|
| 2012/0294694 | A1 | 11/2012 | Garot |
| 2013/0039284 | A1 | 2/2013 | Marinier et al. |
| 2013/0039331 | A1* | 2/2013 | Koorapaty .............. H04L 5/001 370/330 |
| 2013/0114398 | A1 | 5/2013 | Wang |
| 2013/0114535 | A1 | 5/2013 | Ng et al. |
| 2013/0176952 | A1 | 7/2013 | Shin |
| 2013/0188613 | A1 | 7/2013 | Dinan |
| 2013/0201911 | A1* | 8/2013 | Bergstrom ............ H04L 5/0053 370/328 |
| 2013/0242815 | A1 | 9/2013 | Wang |
| 2013/0301491 | A1 | 11/2013 | Bashar et al. |
| 2013/0301566 | A1* | 11/2013 | Wei ..................... H04W 72/048 370/329 |
| 2014/0092758 | A1 | 4/2014 | Suzuki |
| 2014/0119207 | A1* | 5/2014 | Yamada ................ H04L 5/0085 370/252 |

OTHER PUBLICATIONS

3GPP TS 36300 V101.0, Technical Specification, 3rd Generation Partnership Project, Technical Specification Group Radio Access Network, Evolved Universal Terrestrial Radio Access (E-UTRA) and Evolved Universal Terrestrial Radio Access Network, (E-UTRAN), Overall description, Stage 2 (Release 10), Mar. 2012 (194 pages).
3GPP TS 36331 V105.0, Technical Specification, 3rd Generation Partnership Project, Technical Specification Group Radio Access Network, Evolved Universal Terrestrial Radio Access (E-UTRA), Radio Resource Control (RRC), Protocol specification, Mar. 2012 (Release 10) (302 pages).
3GPP TS 36331 V11.0.0 (Jun. 2012), Technical Specification, 3rd Generation Partnership Project, Technical Specification Group Radio Access Network, Evolved Universal Terrestrial Radio Access (E-UTRA), Radio Resource Control (RRC), Protocol specification Jun. 2012 (Release 11) (302 pages).
Wannstrom, 3GPP, www.3gpp.org/Carrier-Aggregation-explained, May 2012 (4 pages).
Freescale Semiconductor, Inc., White Paper, Long Term Evolution Protocol Overview, 2008 (21 pages).
3GPP TSG RAN WG2 Meeting #78, R2-122180, Source: CATT, Title: Initial Consideration on NCT, Agenda Item: 7.1.4, Document for Discussion and Decision, Prague, Czech Republic, May 21-25, 2012 (3 pages).
3GPP TSG-RAN WG2#78 R2-122706, May 21-25, 2012, Prague, Czech Republic, Agenda Item: 7.1.4, Source: Motorola Mobility, Title: New Carrier Type, Document for: Discussion and Decision (2 pages).
3GPP TSG-RAN WG2 #78 R2-122793, May 20-25, 2012, Prague, Czech Republic, Agenda item: 7.1.4, Source: Intel Corporation, Title: Considerations on new carrier type support, Document for: Discussion and Decision (3 pages).
3GPP TSG-RAN2 Meeting #78 R2-122795, Prague, Czech Republic, May 21-25, 2012, Agenda Item: 7.1.4, Source: Intel Corporation, Title: DRX for new carrier type, Document for: Discussion and decision (3 pages).
3GPP TSG RAN WG2#78 R2-122887, Prague, Czech Republic, May 21-25, 2012, Agenda Item: 7.1.4, Source: Samsung, Title: Initial overview on new carrier, Document for: Discussion and decision (2 pages).
3GPP TSG-RAN WG4 Meeting #63 R4-123056, Prague, Czech Republic, May 21-25, 2012, Agenda item: 6.1.3.1, Source: Renesas Mobile Europe Ltd, Title: Considerations on retuning interruptions, Document for: Discussion (7 pages).
TSG RAN meeting #54 RP-111729, Berlin, Germany, Dec. 6-9, 2011, Status Report to TSG, Agenda item: 11.4.4.1, Work Item Name LTE Carrier Aggregation Enhancements—core part, Study Item Name, Acronym LTE-CA-EN-Core, Unique ID 510130, Source: Leading WG TSG RAN WG1, Company: Nokia Corporation (13 pages).
3GPP TSG-RAN Meeting #56 RP-120856, Ljubljana, Slovenia, Jun. 13-15, 2012, Title: Way Forward on Rel-11 completion in RAN1 (2 pages).
U.S. Appl. No. 13/633,471, Non-Final Rejection dated Jun. 12, 2014, pp. 1-19 and attachments.
Research in Motion et al: "Timing and Pathloss Reference for SCell"; 3GPP TSG RAN WG2 Meeting #76, R2-115970; dated Nov. 2011 (2 pages).
Alcatel-Lucent et al: "Pathloss reference for SCell TA group and need of RLM"; 3GPP TSG RAN WG2#77bis, R2-121688; dated Mar. 2012 (2 pages).
European Patent Office, International Search Report and Written Opinion for International Application No. PCT/US2013/063040, dated Jan. 8, 2014 (12 pages).
3GPP TS 36.331 V10.7.0 Technical Specification; 3rd Generation Partnership Project; Technical Specification Group Radio Access network; Evolved Universal Terrestrial Radio Access (E-UTRA); Radio Resource Control (RRC); Protocol Specification, Release 10, Sep. 2012 (304 pages).
European Patent Office, International Search and Written Opinion for International Application No. PCT/US2013/063038, dated Mar. 21, 2014 (7 pages).
U.S. Appl. No. 13/633,471, Final Rejection dated Oct. 17, 2014, pp. 1-22 and attachments.
3GPP TS 36.211 V11.0.0 Technical Specification, 3rd Generation Partnership Project; Technical Specification Group Radio Access Network; Evolved Universal Terrestrial Radio Access (E-UTRA); Physical Channels and Modulation (Release 11) (Sep. 2012) (106 pages).
Canadian Intellectual Property Office, Examination Report for Application No. 2,887,592 dated May 17, 2016 (3 pages).

* cited by examiner

USING A CELL AS A PATHLOSS OR TIMING REFERENCE

CROSS REFERENCE TO RELATED APPLICATION

This is a continuation of U.S. application Ser. No. 14/828,859, filed Aug. 18, 2015, which is a continuation of U.S. application Ser. No. 13/655,797, filed Oct. 19, 2012, U.S. Pat. No. 9,131,434, which are both hereby incorporated by reference in their entirety.

BACKGROUND

Mobile devices are able to communicate with wireless access networks using carriers of various frequencies. A carrier can have a certain frequency bandwidth, such as a frequency bandwidth of 1.25 megahertz (MHz), 5 MHz, 15 MHz, 20 MHz, and so forth.

To increase capacity in communications between mobile devices and wireless access networks, carrier aggregation can be provided, in which multiple carriers can be aggregated. For example, according to the Long-Term Evolution Advanced (LTE-A) standard provided by the Third Generation Partnership Project (3GPP), up to five component carriers can be aggregated in a carrier aggregation. If each carrier has a bandwidth of 20 MHz, then the carrier aggregation that includes five component carriers can have a bandwidth of 100 MHz.

BRIEF DESCRIPTION OF THE DRAWINGS

Some embodiments are described with respect to the following figures.

DETAILED DESCRIPTION

Figure 1:
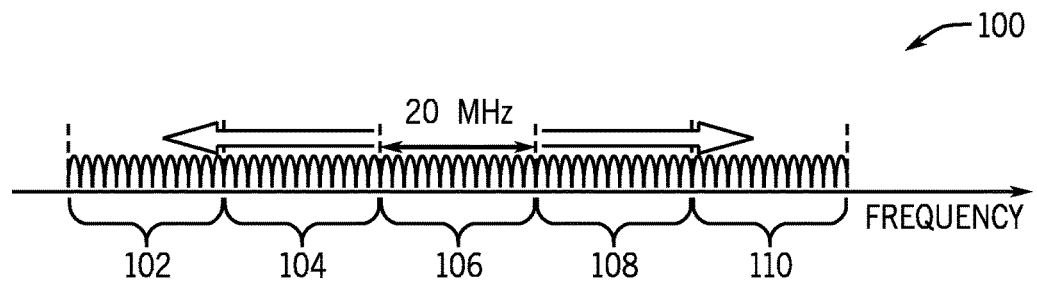
FIG. 1 illustrates an example carrier aggregation having multiple component carriers.

FIG. 1 shows an example carrier aggregation 100 that includes five component carriers 102, 104, 106, 108, and 110. In the example of FIG. 1, each component carrier has a bandwidth of 20 MHz, such that the total bandwidth of the carrier aggregation 100 is 100 MHz. However, in other examples, a carrier aggregation can include less than five or more than five component carriers. Moreover, in further examples, different component carriers of the carrier aggregation 100 can have different bandwidths. Each component carrier 102, 104, 106, 108, or 110 is made up of sub-carriers, where a sub-carrier occupies a portion of the frequency bandwidth of the component carrier.

Although the carrier aggregation 100 of FIG. 1 has component carriers that are adjacent each other in a frequency band, in other implementations, a carrier aggregation can include carriers in non-adjacent (non-contiguous) frequency bands. For example, one component carrier can be located in the 2 gigahertz (GHz) band, while another component carrier may be located in the 800 MHz band.

Figure 2:
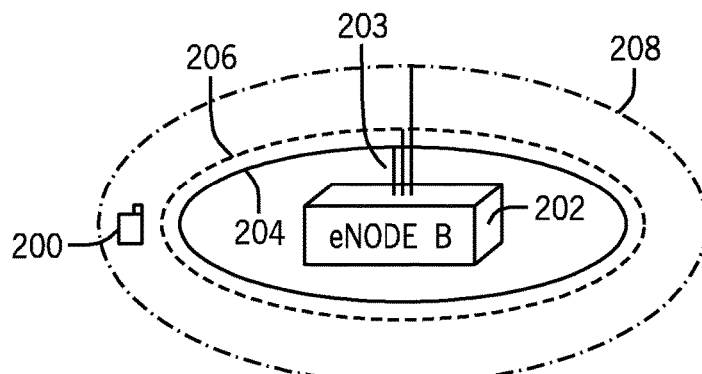
FIG. 2 is a schematic diagram of an example arrangement that includes a wireless access network node and a mobile device, which are configured according to some implementations.

One or more cells can be provided on a given component carrier. A "cell" can refer generally to a coverage area provided by a wireless access network node on the respective component carrier. FIG. 2 illustrates a wireless access network node 202 and cells provided on respective different component carriers of a carrier aggregation. Communication on the component carriers of the carrier aggregation can be performed with an antenna infrastructure 203 of the wireless access network node 202. In some examples, the wireless access network node 202 is an enhanced Node B (eNB) according to the LTE standards. In other examples, other types of wireless access network nodes can be employed.

In the ensuing discussion, reference is made to the LTE standards provided by 3GPP. The LTE standards can include the initial LTE standard as well as the LTE-Advanced standard. The LTE standards are also referred to as the Evolved Universal Terrestrial Radio Access (E-UTRA) standards. Although reference is made to LTE in the ensuing discussion, it is noted that techniques or mechanisms according to some implementations can be applied to other wireless access technologies.

In the example of FIG. 2, it is assumed that the carrier aggregation includes three component carriers. In such example, three cells 204, 206, and 208 of different sizes are provided on the respective three different corresponding component carriers of the carrier aggregation. In other examples, it is noted that at least two of the cells 204, 206, and 208 can have the same or substantially the same cell size.

FIG. 2 also illustrates a mobile device 200 that is able to communicate wirelessly with the wireless access network node 202 when the mobile device 200 is located within at least one of the cells 204, 206, and 208. The mobile device 200 also has an antenna infrastructure to perform communications on the component carriers of a carrier aggregation.

A mobile device can use carrier aggregation when the mobile device is in the connected mode, such as the Radio Resource Control (RRC) connected mode according to LTE. The mobile device is in the connected mode when the mobile device has established a connection with the wireless access network node 202.

When the mobile device is in an idle mode (e.g., RRC idle mode), which is a mode of the mobile device when the mobile device has not established a connection with the wireless access network node 202, then the mobile device is not configured to use carrier aggregation. In idle mode, the mobile device 200 camps on (selects) one frequency, which can be referred to as the primary frequency or primary carrier.

In connected mode when a mobile device can use carrier aggregation, one component carrier can be used as a primary carrier, while the remaining carrier(s) of the carrier aggregation is (are) used as secondary carrier(s). A cell serving the mobile device on a primary carrier can be used as a primary cell, while a cell serving the mobile device on a secondary carrier can be used as a secondary cell. The primary cell is used by the mobile device for various functionalities that are not provided by a secondary cell. As examples, the functionalities of the primary cell can include the provision of system information from the wireless access network to the mobile device, mobility management, performance of semi-persistent scheduling (SPS) in which the wireless access network assigns a predefined amount of radio resources for communications with the mobile device, provision of a physical uplink control channel (PUCCH) that is used by the mobile device to transport signaling information, and so forth.

The component carriers that make up a carrier aggregation may all be compatible with a particular (existing) wireless access protocol. A component carrier that is compatible with the particular wireless access protocol (or an earlier release of the wireless access protocol) can be referred to as backward compatible carrier. If the component carriers of the carrier aggregation are all backward compatible carriers, then the mobile device can use any of the component carriers of the carrier aggregation as the primary carrier. Stated differently, a cell on any of the backward compatible carriers of the carrier aggregation can be used by the mobile device as the primary cell.

In some implementations, in addition to backward compatible carriers, a wireless access network may also employ a carrier that is not backward compatible. Thus, in the context of a carrier aggregation used by the mobile device that is in the connected mode, the carrier aggregation may have at least one backward compatible component carrier as the primary carrier and zero or more component carriers of a different type that are not backward compatible as secondary carrier(s), For example, as part of carrier aggregation enhancements currently studied by the 3GPP, a new carrier type will be defined that provides for enhanced features, including enhanced spectral efficiency, improved energy efficiency, improved support for heterogeneous networks, and so forth. This carrier of the new carrier type is referred to as an NCT carrier in the ensuing discussion.

Cell Selection or Reselection

When a mobile device first powers up or first enters a wireless access network from another wireless access network, the mobile device can perform a procedure to select a cell (possibly from among multiple cells) to camp on (this procedure is referred to as a cell selection procedure). Cell selection is performed with the mobile device in idle mode. After a mobile device has camped on a cell, the mobile device can move to another cell in a cell reselection procedure, in response to certain criteria being met. Cell reselection is performed with the mobile device in the idle mode.

Cell selection or reselection is performed by the mobile device in a wireless access network that supports carrier aggregation. As noted above, in idle mode, the mobile device selects a single carrier, which is the primary carrier. It is only after the mobile device has transitioned to connected mode that carrier aggregation can be configured for the mobile device.

As part of cell selection or reselection in idle mode, under certain circumstances, an NCT carrier should not be used as the primary carrier. A carrier that is not used as the primary carrier is a carrier on which a primary cell should not be provided. For example, an NCT carrier may not carry reference or synchronization signals, or the NCT carrier may not communicate certain system information or may not communicate any system information. As a result, a cell on the NCT carrier may not be optimum for primary cell operations.

Multiple cells can be provided on an NCT carrier. Similarly, multiple cells can also be provided on a backward compatible carrier. In some implementations, there can be a mixed deployment on the NCT carrier, in which both backward compatible cells and NCT cells can be provided on the NCT carrier. A backward compatible cell on the NCT carrier is a cell that has features that are compatible with an existing wireless access protocol (a wireless access protocol that does not support NCT). An NCT cell on the NCT carrier is a cell that has features that are incompatible with the existing wireless access protocol or the wireless access protocol releases which do not support an NCT cells or an NCT carrier.

An example of the mixed deployment on an NCT carrier is provided below. A network operator may deploy NCT cells on the NCT carrier in some geographic areas, but deploy backward compatible cells on the NCT carrier in other geographic areas. The areas where NCT cells are deployed can be hotspots, for example, where there may be a greater amount of data communications.

In the mixed deployment noted above, it may be possible for a mobile device to select (either as part of a cell selection procedure or cell reselection procedure) a backward compatible cell on an NCT carrier to use as a primary cell. However, as noted above, such a backward compatible cell on the NCT carrier would not be optimum for primary cell operations. In accordance with some implementations, as part of a cell selection or reselection procedure, the mobile device should avoid selecting a cell on an NCT carrier (in other words, the mobile device should avoid using the NCT carrier as a primary carrier).

It is noted that avoiding use of an NCT carrier as a primary carrier can also help reduce power consumption at the mobile device (and thus conserve battery power) under certain conditions. In some implementations, an NCT carrier may carry synchronization signals transmitted by a wireless access network node, where the synchronization signals can be used at a mobile device to perform synchronization processing. Examples of synchronization signals can include a primary synchronization signal (PSS) and a secondary synchronization signal (SSS). An NCT carrier may carry synchronization signals such as PSS and SSS in implementations where an NCT carrier and a backward compatible carrier are not synchronized with respect to each other; in such implementations, synchronization processing would have to be performed at the mobile device on the NCT carrier.

In implementations where the NCT carrier and its associated backward compatible carrier are unsynchronized, the presence of synchronization signals such as PSS and SSS on the NCT carrier may allow a mobile device to detect a cell on the NCT carrier. However, an NCT carrier may not broadcast a physical broadcast channel (PBCH) or other essential system information blocks, for example, System Information Block Types 1 and 2. If the mobile device does not detect a PBCH or other essential system information blocks even though the mobile device detects a cell on the NCT carrier, the mobile device may decide to stay on the NCT carrier but may attempt to find another intra-frequency cell (another cell on the same NCT carrier). This search may lead to increased power consumption and thus may drain the mobile device's battery.

In some implementations, the wireless access network node 202 of FIG. 2 is able to send, to the mobile device 200, information relating to an NCT carrier, such that the mobile device 200 can use the information to avoid selecting the NCT carrier as a primary carrier (as either part of a cell selection or reselection procedure). As explained further below, the type of information that is sent to the mobile device 200 can include information useable by either an NCT-capable mobile device or a legacy mobile device. An NCT-capable mobile device is capable of communication on an NCT carrier, but a legacy mobile device does not support communication on an NCT carrier. Note that when the mobile device is in idle mode, the network does not know whether the mobile device 200 is NCT-capable or not. However, when the mobile device is in connected mode, the network may be aware of whether the mobile device 200 is NCT-capable or not based on the capability information submitted by the mobile device.

Figure 3:
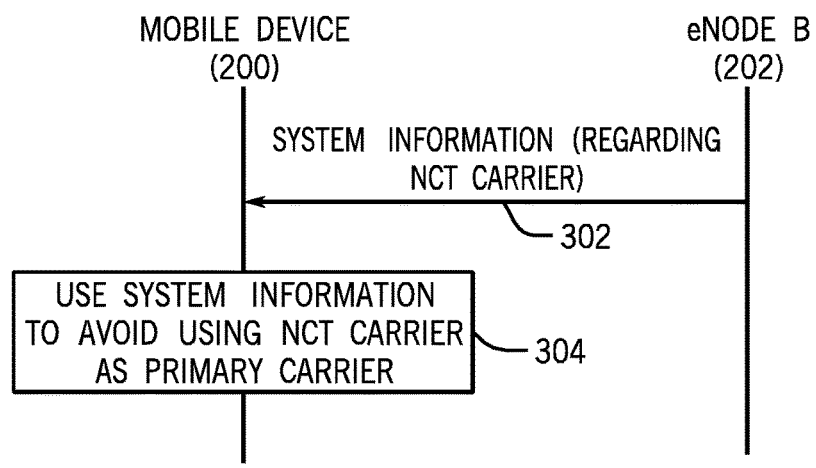
FIG. 3 is a message flow diagram of a process relating to a new carrier type (NCT) carrier, according to some implementations.

FIG. 3 is a flow diagram that illustrates tasks performed according to some implementations. In some implementations, the wireless access network node 202 sends (at 302) system information to the mobile device 200, where the system information includes information regarding an NCT carrier. The system information can be in an RRC message or another type of message that has information elements.

The system information sent at 302 can be in a broadcast message sent by the wireless access network node 202 to multiple mobile devices.

As examples, the system information can include any one of the following information elements (which can be included in a broadcast System Information Message, for example): System Information Block Type 1, System Information Block Type 4, and System Information Block Type 5. In other examples, information regarding the NCT carrier can be carried in other information elements or other messages from the wireless access network node 202 to the mobile device 200.

As further shown in FIG. 3, the mobile device 200 can use (at 304) the information regarding the NCT carrier to avoid using the NCT carrier as a primary carrier, such that the mobile device 200 does not camp on a cell on the NCT carrier as part of cell selection or reselection.

As noted above, the mobile device 200 can be an NCT-capable mobile device or a legacy mobile device. For the case of an NCT-capable mobile device 200, the information that is sent at 302 can identify a particular carrier as being an NCT carrier (such as by identifying its frequency), and can further identify an associated backward compatible carrier (a backward compatible carrier that is associated with the NCT carrier). The identified associated backward compatible carrier can direct the NCT-capable mobile device 200 to the associated backward compatible carrier for cell reselection.

The system information sent at 302 can also specify whether or not the NCT-capable mobile device 200 is allowed to use the identified NCT carrier as a primary carrier. In addition, the information sent at 302 can include other related information, including configuration information relating to control signaling in the NCT cell, such as configuration information relating to a synchronization signal, a reference signal, and so forth.

The system information sent at 302 to an NCT-capable mobile device 200 can be sent by a backward compatible cell on the NCT carrier or on a backward compatible carrier, in some examples. In other examples, the system information sent at 302 can be sent by an NCT cell on an NCT carrier, in implementations where an NCT cell is able to send system information.

To communicate some of the system information noted above, the following new fields can be added to the System Information Block Type 1, according to some examples:

```
SystemInformationBlockType1-vbxx-IEs  ::=  SEQUENCE {
    newCarrierType-vbxx          ENUMERATED {allowed, notallowed}   OPTIONAL,
    associatedCarrierFreq-vbxx   ARFCN-ValueEUTRA                    OPTIONAL,
    nonCriticalExtention                   SEQUENCE { }              OPTIONAL
}
```

The newCarrierType field identifies an NCT carrier, and further, a value "allowed" or "notallowed" can be provided to indicate whether or not, respectively, the mobile device is allowed to camp on the identified NCT carrier or select the identified NCT carrier as a primary carrier. The associatedCarrierFreq field identifies the associated backward compatible carrier.

Alternatively, the information element System Information Block Type 5 can be used to identify an NCT carrier and the associated backward compatible carrier, such as by adding the following fields to inter-frequency carrier information:

```
[[  newCarrierType-r12        ENUMERATED {allowed, not allowed}   OPTIONAL,
    associatedCarrierFreq-r12  ARFCN-ValueEUTRA                    OPTIONAL,
]]
```

The foregoing fields of System Information Block Type 5 are similar to corresponding fields in System Information Block Type 1 discussed above. System Information Block Type 5 contains information for inter-frequency cell reselection, including information about frequencies and neighboring cells relevant for cell reselection.

If the newCarrierType field includes a "notallowed" value, then an NCT-capable mobile device does not camp on the NCT carrier, but instead can perform inter-frequency cell reselection to the backward compatible carrier identified by the associatedCarrierFreq field. In other implementations, the information element System Information Block Type 4, which contains information for intra-frequency cell reselection, may include the newCarrierType field and associatedCarrierFreq field if the System Information Block Type 4 is broadcast in an NCT cell. If the newCarrierType field includes a "notallowed" value, then an NCT-capable mobile device does not camp on the NCT carrier, but instead can perform inter-frequency cell reselection to the backward compatible carrier identified by the associatedCarrierFreq field. If the associatedCarrierFreq is not indicated, an NCT-capable device performs inter-frequency cell reselection to any other carriers.

In alternative implementations, the system information sent at 302 to an NCT-capable mobile device 200 may contain the identities (e.g. physical cell identities or PCIs) of NCT cells. For example, a preconfigured range of PCIs can correspond to NCT cells, such that any cell identified by the wireless access network node as having a PCI within the predefined range should not be used by the mobile device as a primary cell.

In further implementations, on an NCT carrier, a primary synchronization signal (PSS) and secondary synchronization signal (SSS) may be transmitted on different resource elements than the PSS and SSS for backward compatible carriers. A resource element is a basic resource unit for OFDM systems, and can be defined to include a fixed number of sub-carriers and a fixed number of OFDM symbols. For example, a resource element can be defined to include one sub-carrier and one OFDM symbol. In some examples, the PSS and SSS of the NCT carrier may be provided in different sub-carriers and orthogonal frequency-divisional multiplexing (OFDM) symbols than PSS and SSS for backward compatible carriers. For cell selection and reselection, the mobile device may not have to search for the corresponding PSS or SSS in the different resource elements of the NCT carrier, and thus the mobile device would not camp on an NCT carrier.

In the case where the mobile device 200 is a legacy mobile device, then the system information sent at 302 in FIG. 3 can identify a cell that is barred, in conjunction with an indication that the mobile device is not allowed to perform intra-frequency cell reselection to prevent the mobile device from camping on the carrier associated with the barred cell. The barred cell can be a cell on an NCT carrier. The indication that prevents intra-frequency cell reselection would thus prevent the mobile device from camping on the NCT carrier.

For example, the wireless access network node 202 can send a System Information Block Type 1 to identify the barred cell(s) and to indicate intra-frequency cell reselection is not allowed. The System Information Block Type 1 can include the following fields:

cellBarred ENUMERATED {barred, notBarred},
      intraFreqReselection ENUMERATED {allowed, notAllowed}.

In the foregoing example, the cellBarred field can be set to the value "barred" to indicate that the cell is barred, and the intraFreqReselection field is set to "notAllowed" to indicate that intra-frequency cell reselection to the carrier of the barred cell is not allowed. In this way, if the cellBarred field identifies a barred cell on an NCT carrier and the intraFreqReselection field is set to "notAllowed," the legacy mobile device would not attempt to camp on the NCT carrier, and in fact, would transition to another (backward compatible) carrier to camp on. An NCT-capable mobile device may read the new carrier type information element. If the new carrier type information element is set to "allowed," the mobile device may camp on the cell.

As yet another alternative, the information element System Information Block Type 5 can be used to prevent cell reselection to an NCT carrier. As noted above, System Information Block Type 5 contains information for inter-frequency cell reselection (the information can be a list of carriers for cell reselection). By not including information relating to an NCT carrier in the list of carriers for cell reselection, the mobile device is prevented from reselecting to an NCT carrier.

As a further alternative, the information element System Information Block Type 5 may also include a blacklist of physical cell identities (PCIs) or a PCI range that identify cells that are not to be selected in a cell reselection procedure. An example of a blacklist field is as follows:

interFreqBlackCellList              InterFreqBlackCellList OPTIONAL.

The foregoing blacklist field can identify an NCT cell, which would prevent inter-frequency cell reselection to the NCT cell. The mobile device would not select any cell identified by a PCI in the blacklist during inter-frequency cell reselection. If an NCT cell is identified in the blacklist, then the mobile device would not camp on the NCT cell.

In other implementations, the information element System Information Block Type 4, which contains neighboring cell-related information for intra-frequency cell reselection, can also include an intra-frequency blacklist, such as the following field:

IntraFregBlackCellList ::=SEQUENCE (SIZE (1..maxCellBlack)) OF PhysCellIdRange.

The field IntraFreqBlackCellList provides a list of blacklisted intra-frequency neighboring cells, which prevents intra-frequency cell reselection. An NCT cell may be included in this list. The mobile device would not select any cell identified by a PCI in the blacklist of the System Information Block Type 4 during intra-frequency cell reselection. If an NCT cell is identified in the blacklist of the System Information Block Type 4, then the mobile device would not camp on the NCT cell.

The foregoing assumes that the blacklist in the System Information Block Type 4 or 5 can provide an explicit PCI for an NCT cell. In other implementations, as explained further below in the "Cell Detection and Measurement in Connected Mode" section, the PCI of the NCT cell can be implicitly computed from a PCI of a backward compatible cell. In such implementations, given that the blacklist includes the PCI of a backward compatible cell on a backward compatible carrier associated with an NCT carrier, the mobile device is able to compute the PCI of the NCT cell based on the PCI of the backward compatible cell, and avoid camping on the NCT cell.

Alternatively, the wireless access network node 202 can assign a lower priority to NCT carriers as compared to backward compatible carriers, such that a legacy mobile device would attempt to select a backward compatible carrier (which has a higher priority) before attempting to select an NCT carrier. Alternatively, the wireless access network does not indicate a priority to NCT carriers. The carriers without priority indication may be considered as having lower (or lowest) priority.

As a further alternative, if a legacy mobile device fails to find a physical broadcast channel (PBCH) or other essential system information blocks for a predetermined number of cells on a given NCT carrier, then the legacy mobile device may leave the given NCT carrier.

Cell Detection and Measurement in Connected Mode

In connected mode, a mobile device may perform measurements (radio resource management or RRM measurements) regarding cells within the range of the mobile device such that the mobile device can provide information regarding which cells are better for the mobile device to connect to as compared to other cells. This information can be provided in a measurement report, for example, to a wireless access network node. The wireless access network node can then decide which cell the mobile device is to connect to (handed over to) based on the information from the mobile device.

To properly perform measurement regarding a cell, the mobile device has to first be able to detect the cell. However, as discussed below, detection of a cell on an NCT carrier may not be possible using traditional cell search procedures. That is because certain synchronization signals may not be available on the NCT carrier.

For example, in some cases, an NCT carrier may be synchronized with a backward compatible carrier. Carriers that are synchronized in time and frequency enable the mobile device to not have to perform separate synchronization processing on the NCT carrier. In implementations in which the NCT carrier is synchronized with a backward compatible carrier, synchronization signals, such as a primary synchronization signal (PSS) and a secondary synchronization signal (SSS), may not be transmitted on the NCT carrier. As a result, the mobile device cannot rely on a cell search procedure based on the PSS and SSS to detect a neighbor cell operating on an NCT carrier to perform measurements. Thus, an alternative cell search procedure should be used, in which the wireless access network node sends information to the mobile device to assist the mobile device in detecting and measuring a cell on an NCT carrier. As used here, detecting a cell can refer to either (1) detecting the cell based on synchronization signals such as PSS and SSS, or (2) identifying the cell based on other information provided by the wireless access network node to the mobile device.

Once a cell on an NCT carrier is detected, the mobile device can perform measurements on predefined signals. For example, according to LTE, the mobile device can measure a Common Reference Signal (CRS) to obtain one or both of the following measurements: Reference Signal Received Power (RSRP) and Reference Signal Received Quality (RSRQ). RSRP is an average power of a downlink reference signal, such as the CRS, across a frequency bandwidth. RSRQ provides an indication of signal quality, and is based on a ratio of RSRP to a carrier received signal strength indicator (RSSI) (which represents received power).

For an NCT-capable mobile device to perform RRM measurements correctly in an NCT cell, the NCT-capable mobile device has to identify symbols in which the CRS is transmitted in the NCT cell. On the other hand, a legacy mobile device should avoid measuring an NCT cell since the legacy mobile device does not understand in which resource elements of the NCT cell a CRS is carried.

There are thus several issues associated with performing RRM measurements for an NCT cell. First, an NCT-capable mobile device has to be able to detect an NCT cell before a measurement can be performed. Second, once an NCT cell is detected, correct measurement has to be performed based on reference signals. Third, a legacy mobile device should avoid performing measurements in an NCT cell.

In accordance with some implementations, to address the first issue above (to allow an NCT-capable mobile device to detect an NCT cell), the wireless access network node 202 of FIG. 2 can send (at 402 in FIG. 4A) a measurement configuration including information indicating the frequency of the NCT carrier and identifying a backward compatible carrier that is associated with the NCT carrier, such as in a measurement object. In some examples, the measurement object can be specified by the Radio Resource Control (RRC) protocol of LTE; for example, the measurement object can be included in a RRC connection reconfiguration message. Specifically, in some examples, the measurement object can be the MeasObjectEUTRA information element. In other examples, the information can be carried in other types of information elements or messages.

Figure 4A:
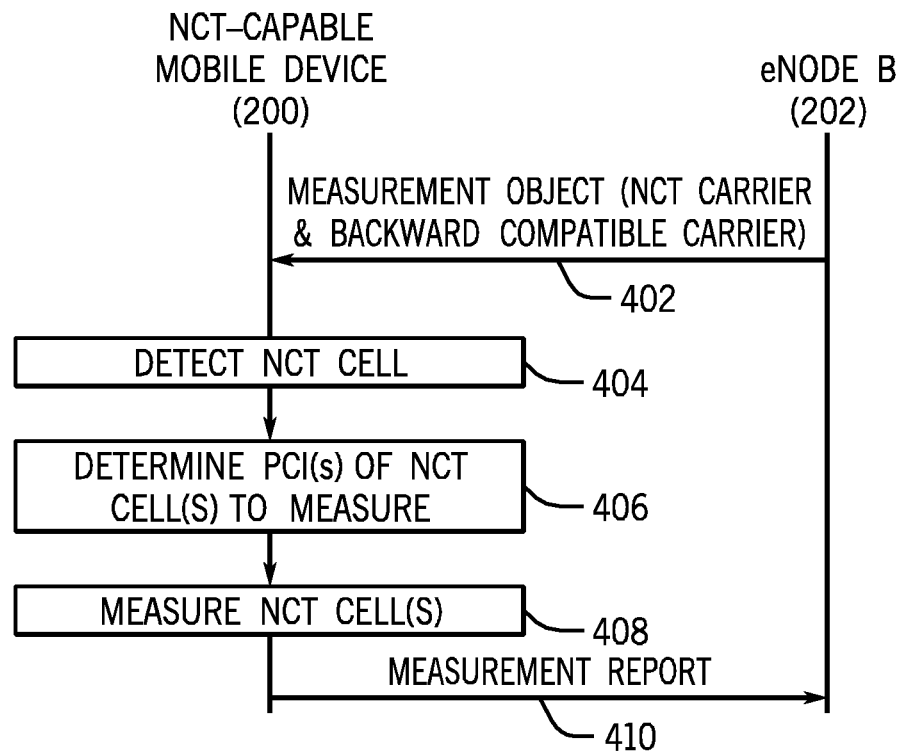
FIG. 4A is a message flow diagram of a process for detecting and measuring NCT cells, in accordance with some implementations.
Figure 4B:
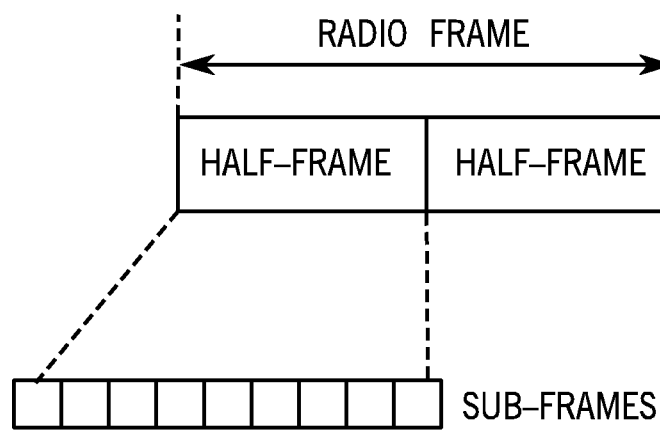
FIG. 4B illustrates an example frame structure used for radio communications.

If the NCT carrier is synchronized with its associated backward compatible carrier (identified in the measurement object), the mobile device can rely on the PSS and SSS on the backward compatible carrier for slot, subframe, and frame synchronization of the NCT carrier. According to LTE, a radio frame is a structure defined for carrying data, where a frame can include subframes, and each subframe can have time slots, as depicted in FIG. 4B. In the example of FIG. 4B, the radio frame is divided into two half-frames, and each half-frame includes a number of subframes. Moreover, each subframe can include two time slots.

If the NCT carrier does not carry PSS and SSS, then the NCT-capable mobile device would not be able to detect an NCT cell on the NCT carrier. However, in the scenario where the NCT carrier is synchronized with the associated backward compatible carrier, the PSS and SSS of the backward compatible carrier can be used for slot, subframe, and frame synchronization on the NCT carrier. In this manner, the NCT-capable mobile device is able to detect (at 404) the NCT cell.

As discussed above, a second issue associated with measurement of an NCT cell is that information should be provided by the wireless access network node to the NCT-capable mobile device to allow the mobile device to perform correct measurement of the NCT cell. To do so, as depicted in FIG. 4A, the NCT-capable mobile device determines (at 406) the PCI(s) of the NCT cell(s) to measure, either based on explicit or implicit indication, as discussed below.

For explicit indication, the wireless access network node 202 may provide (in the measurement object sent at 402) a list of PCIs or a PCI range of cells (which can include NCT cells) to measure in the measurement object. The list may be included in an existing cell list in the measurement object, such as the CellsToAddModList field. Note that the list does not preclude the mobile device from detecting and measuring other cells not on the list. Alternatively, the list may be included in a new list for NCT cells to allow the NCT-capable mobile device to detect just the listed cells, to reduce power consumption at the mobile device.

In addition to PCI information, additional information can be provided to the mobile device in the measurement object (sent at 402), including as examples the following: location of synchronization signals, location of reference signals, cyclic prefix (CP) length (which specifies a length of the cyclic prefix that prefixes a symbol with a repetition of an end portion); a physical hybrid-ARQ indicator channel (PHICH) configuration, and a symbol level timing offset of the associated of the backward compatible carrier. The PHICH is used to carry the hybrid automatic repeat request (HARQ) that indicates to the mobile device whether the wireless access network node 202 has correctly received uplink data. The symbol level timing offset specifies a number of symbols that an NCT cell is offset from the associated backward compatible cell (in the case where an NCT carrier is synchronized with the backward compatible carrier). The offset of the NCT cell from the backward compatible cell by a few symbols is provided to avoid interference between the NCT cell and the backward compatible cell.

For implicit indication, the NCT-capable mobile device may derive the PCIs of NCT cells to measure from PCIs detected on the associated backward compatible carrier. In some implementations, the measurement object sent at 402 can include a field settable to one of several values to indicate how a PCI of an NCT cell can be derived from a PCI of a backward compatible cell.

For example, in certain deployment scenarios, the PCI of an NCT cell to measure may be identical to the PCI of a cell detected on the associated backward compatible carrier. Such deployment scenarios include a first scenario where an NCT cell on an NCT carrier is co-located and overlaid with a backward compatible cell on a backward compatible carrier, such that the two cells provide nearly the same coverage area. An NCT cell and backward compatible cell are co-located if the antenna assembly for the NCT cell and the antenna assembly for the backward compatible cell are located generally at the same location. Overlaying the NCT and backward compatible cells refers to defining the coverage areas in which at least a first coverage area corresponding to one of the cells is substantially the same as or is a subset of the coverage area of another of the cells.

A second scenario where the PCI of an NCT cell to measure may be identical to the PCI of a cell detected on the associated backward compatible carrier, involves a scenario in which the NCT cell and backward compatible cell are co-located and overlaid, but one of the NCT and backward compatible cells provides a smaller coverage area due to larger path loss (propagation signal loss between a wireless access network node and a mobile device).

In other deployment scenarios, the PCI of an NCT cell to measure can be calculated from the PCI of a detected cell on the associated backward compatible carrier by adding predetermined or signaled range of offset values. One scenario in which the foregoing can be performed is a scenario in which a backward compatible carrier is used to provide macro coverage (from an antenna assembly of a wireless access network node), while remote radio heads can be used to provide the NCT carrier. Remote radio heads can be used to improve throughput at hot spots at specific locations within the coverage area(s) of the backward compatible carrier.

In an example of the above deployment scenario, the PCI of the macro layer (the coverage area provided by the backward compatible carrier) may be 7*n (where n can be an integer between 0 and 71), and the PCI of an remote radio head cell (NCT cell) can be computed as 7*n+1, 2, . . . , 5.

Other scenarios in which the PCI of an NCT cell can be computed based on a PCI of a backward compatible cell can include the following scenarios. In one such scenario, the antenna assemblies for the NCT and backward compatible carriers are co-located, but the antenna for the NCT carrier can be directed to the boundaries of cells on the backward compatible carrier, such that cell edge throughput is increased. Another scenario in which the PCI of an NCT cell can be computed based on the PCI of a backward compatible cell is a scenario where the NCT and backward compatible cells are co-located and overlaid, but the coverage area provided by the NCT cell is smaller such that frequency selective repeaters are deployed for extending coverage.

With regard to the CP length and PHICH configuration, the mobile device may assume that they are same as the respective CP length and PHICH configuration of the associated backward compatible carrier. The mobile device may also assume that symbol level timing offset from the associated backward compatible carrier is zero. The PHICH configuration and symbol level timing offset from the associated backward compatible carrier may be signaled to the mobile device.

As further depicted in FIG. 4A, after the PCI(s) of the NCT cell(s) to measure is (are) determined, the NCT-capable mobile device 200 can measure (at 408) the corresponding NCT cell(s).

If an NCT cell to be measured transmits no PSS and SSS, the measurement object (sent at 402) may so indicate so that the NCT-capable mobile device can skip detecting PSS and SSS, and can immediately perform measurement (at 408) of a reference signal. The measurement object can include configuration information for the reference signal of the NCT cell so that the mobile device can measure the reference signal. In some implementations, the reference signal can be a Common Reference Signal (CRS) or a Channel State Information Reference Signal (CSI-RS). In other implementations, other types of reference signals can be measured.

The reference signals measured are in the cells (including NCT cells) identified by the PCIs explicitly provided by the wireless network node in the measurement object or implicitly determined by the mobile device. Since CRS transmission may be limited in an NCT cell, the wireless access network node may provide the timing information (e.g. periodicity and offset) and the bandwidth of the CRS transmission together with PCI information. Alternatively, the wireless access network node may provide the mobile device with configuration information of the CSI-RS, including antenna ports to monitor.

The mobile device may confirm that a cell is detected if the RSRP reading is above a predetermined or signaled threshold. If the RSRP reading is above the threshold, then the mobile device can determine that the measurement of the reference signal is correct.

Using the foregoing information, the NCT-capable mobile device is able to measure an NCT cell without first obtaining the PSS and SSS. One of the benefits of this scheme is that the measurements can be done faster and the mobile device's battery power can also be saved since a PSS and SSS scanning procedure can be skipped.

Alternatively, an NCT cell may transmit PSS and SSS, but less frequently than backward compatible cells or they are mapped to resource elements different from those used in backward compatible cells. The wireless access network node may indicate the mapping of PSS and SSS to the resource elements in the measurement object sent at 402. The NCT-capable mobile device may decide an NCT cell is detected if the PSS and SSS which correspond to one of the explicitly or implicitly provided PC's are detected at the indicated resource elements.

After measurement of the NCT cell(s), the NCT-capable mobile device 200 can send (at 410) a measurement report to the wireless access network node 202, where the measurement report includes information pertaining to the measurement(s) of NCT cell(s).

Figure 5:
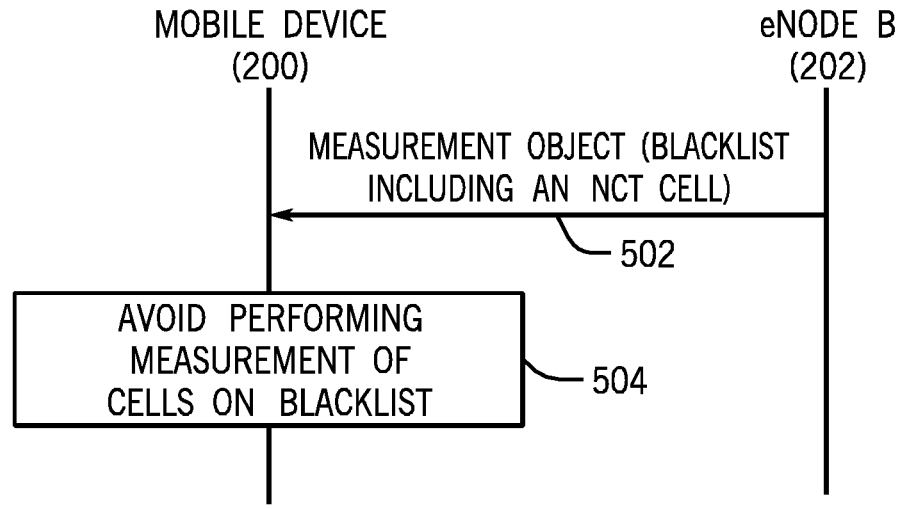
FIG. 5 is a message flow diagram of a process to prevent measurement of an NCT cell, according to some implementations.

As discussed above, a third issue to be addressed in some implementations is that a legacy mobile device 200 should avoid performing measurements in an NCT cell. In some examples, as depicted in FIG. 5, the wireless access network node 202 can transmit (at 502) a message that contains a blacklist of cells to the legacy mobile device 200, where the blacklist can include a PCI or a range of PC's that identify cells (including NCT cells) for which the legacy mobile device 200 is not to perform measurements. Note that this blacklist can also be used by an NCT-capable mobile device to avoid performing measurements in cells identified in the blacklist. The foregoing assumes that the blacklist can include an explicit PCI for an NCT cell. In other implementations, as explained above, the PCI of the NCT cell can be implicitly computed from a PCI of a backward compatible cell. In such implementations, given that the blacklist includes the PCI of a backward compatible cell on a backward compatible carrier associated with an NCT carrier, the mobile device is able to compute the PCI of the NCT cell based on the PCI of the backward compatible cell, and avoid performing a measurement of such NCT cell.

In some examples, the blacklist can be included in a measurement object, such as the MeasObjectEUTRA information element discussed above. In other examples, the blacklist can be carried in other types of information elements or messages. As yet another alternative, the network can avoid including a measurement object in a cell on the NCT carrier so that the legacy mobile device does not measure the cell on the NCT carrier.

Using the information in the blacklist, the mobile device 200 avoids (at 504) performing measurement of cells (including any NCT cell) identified in the blacklist.

In some examples, for an NCT carrier, a measurement object may include the following information:

NCT type:
  Synchronized or unsynchronized carrier. In an example, this can be carried in a newCarrierType field of the MeasObjectEUTRA information element, and the field can indicate whether the NCT carrier is synchronized or unsynchronized (an NCT carrier being synchronized or unsynchronized with respect to an associated backward compatible carrier is explained above).

NCT cells to measure:
  PCI or PCI range are explicitly indicated by a list, such as a newCarrierTypeCellsToAddModList field (to add the listed NCT cells to a cell list) or a cellsToAddModList field (to add the listed cells to a cell list) of the MeasObjectEUTRA information element. Note that the MeasObjectEUTRA information element can also include a newCarrierTypeCellsToRemoveList field (to remove the listed NCT cells from the cell list) and a cellsToRemoveList field (to remove the listed cells from the cell list). Alternatively, a PCI can be implicitly based on information in a cell (e.g. primary cell, secondary cell, neighbor cell) on the associated backward compatible carrier. For example, a newCarrierTypeCellsImplicitInd field of the MeasObjectEUTRA information element can be used to indicate implicitly NCT cells to add or modify in the cell list based on the detected cells on the associated backward compatible carrier. The field can have a "same" value to indicate that the mobile device detects and measures the same PCI(s) as the PCI(s) of detected cell(s) on the associated backward compatible carrier. The field can have an "equation1" value to indicate that the mobile device derives a PCI of an NCT cell by applying a corresponding equation to the PCI(s) of detected cell(s) on the associated backward compatible carrier.

Synchronization signal mapping:
  Position of PSS and SSS in time (e.g. periodicity and offset) and frequency or mapping of reference signals to time and frequency resource is indicated. The PSS and SSS may be less frequently transmitted than on a backward compatible carrier. The PSS and SSS may be mapped to resource elements differently than in a backward compatible cell. Alternatively, there may be no PSS and SSS in an NCT cell or different synchronization signal may be used. The synchronization signal mapping may be carrier frequency or cell specific. For example, a newCarrierTypeSSConf field can be provided in the MeasObjectEUTRA information element to indicate a configuration of the synchronization signals, and the mapping of these synchronization signals to resource elements.

Reference signal mapping:
  Position of at least one of CRS and CSI-RS in time (periodicity and offset) and frequency may be indicated. For CSI-RS measurement, a specific single or multiple antenna ports may be indicated for the measurement. The information may be cell specific or carrier frequency specific. For example, a newCarrierTypeRSConf field can be provided in the MeasObjectEUTRA information element to indicate a configuration of the reference signal, which may be at least one of CRS or CSI-RS. Antenna port information may be signaled with CSI-RS-Config in a CSI-RS Configuration information element.

Cyclic Prefix Length:
  Normal or extended. The information is carrier frequency specific. For example, a newCarrierTypeCyclicCP-Length field can be provided in the MeasObjectEUTRA information element to indicate a cyclic prefix length (normal or extended).

PHICH configuration:
  PHICH configuration is indicated. If not indicated, PHICH is not configured. The configuration may be cell specific or carrier frequency specific. For example, a newCarrierTypePHICH-Config field can be provided in the MeasObjectEUTRA information element to indicate the PHICH configuration. In addition to PHICH configuration, Enhanced PHICH information may be indicated.

Symbol level timing offset from the associated backward compatible cell:
  An NCT cell may be synchronized to the backward compatible cell on the associated backward compatible carrier, but is offset by a few symbols in order to avoid interference. For example, a newCarrierTypeOffset field can be provided in the MeasObjectEUTRA information element to indicate the timing offset.

Blacklist for legacy mobile device:
  PCI or PCI range of NCT cells may be indicated by a blacklist. For example, a blackCellsToAddMoList in the MeasObjectEUTRA information element can specify cells (including NCT cells) to add to a black list of cells.

More specific example fields (discussed above) of the MeasObjectEUTRA information element are provided below:

```
MeasNewCarrierType-r12 ::=        SEQUENCE {
   newCarrierType-r12                      ENUMERATED {synchronised, unsynchronised},
   newCarrierTypeCellsToAddModList-r12    NewCarrierTypeCellsToAddModList-r12OPTIONAL,
   newCarrierTypeCellsToRemoveList-r12    CellIndexList                         OPTIONAL,
   newCarrierTypeCellsImplicitInd-r12EMUMERATED {same, equation1, equation2, spare1,...}OPTIONAL,
                  -- Need ON
   newCarrierTypeSSConf-r12                NewCarrierTypeSSConf-r12       OPTIONAL,
   newCarrierTypeRSConf-r12                NewCarrierTypeRSConf-r12       OPTIONAL,
   newCarrierTypeCyclicCPLength-r12          ENUMERATED {len1, len2}  OPTIONAL,
   newCarrierTypePHICH-Config-r12            PHICH-Config                 OPTIONAL,
   newCarrierTypeOffset                    INTEGER(-4..4)                 OPTIONAL
}
NewCarrierTypeCellsToAddModList-r12 ::=   SEQUENCE (SIZE (1..maxCellMeas)) OF CellsToAddMod-
r12
CellsToAddMod-r12 ::=SEQUENCE {
   cellIndex                         INTEGER (1..maxCellMeas),
   physCellId                        PhysCellId,
   cellIndividualOffset              Q-OffsetRange,
   newCarrierTypeSSConf-r12          NewCarrierTypeSSConf-r12 OPTIONAL,
   newCarrierTypeRSConf-r12          NewCarrierTypeRSConf-r12 OPTIONAL,
   newCarrierTypePHICH-Config-r12    PHICH-Config                         OPTIONAL
   newCarrierTypeOffset              INTEGER(-4..4)                       OPTIONAL
}
NewCarrierTypeRSConf-r12 ::= SEQUENCE {
   crs-Config-r12    CRS-Config-r12    OPTIONAL,
   csi-RS-Config-r12 CSI-RS-Config-r12   OPTIONAL
}
CSI-RS-Config-r12 :: = SEQUENCE {
```

Although specific example fields of a measurement object are provided above, it is noted that similar information can be carried in other types of information elements or messages.

Pathloss Reference and Timing Reference

With carrier aggregation, a timing advance (TA) group can be defined, where a TA group can refer to a group of serving cells (which can serve a mobile device) that use the same timing reference cell and the same timing advance value. A timing advance value corresponds to a length of time a signal takes to reach a wireless access network node from a mobile device. The timing advance value is used to compensate for round trip time, and propagation delay of signals that travel from the wireless access network node to the mobile device, and from the mobile device to the wireless access network node. A TA group that includes a primary cell is referred to as a primary TA group. A TA group that does not contain the primary cell is referred to a secondary TA group.

As noted above, a TA group uses one of the cells in the group as a timing reference cell. The timing reference cell is the cell in the TA group that is used by a mobile device to derive timing information. For example, the mobile device can derive timing information based on synchronization signals (such as PSS or SSS) in the timing reference cell.

In a primary TA group, the primary cell is used as the timing reference cell. However, in a secondary TA group, which does not include a primary cell, a mobile device is able to choose a cell from among the cells in the secondary TA group to use for timing reference. However, with carrier aggregation that includes multiple cells defined on respective component carriers, at least one of the cells can be an NCT cell on an NCT carrier. As noted above, an NCT carrier can be synchronized with an associated backward compatible carrier. In such implementations, as explained above, synchronization signals (such as PSS or SSS) would not be transmitted in the NCT cell. As a result, when the NCT carrier and the associated backward compatible carrier are synchronized, it would not be appropriate to use an NCT cell as a timing reference cell.

In some implementations where the NCT carrier is not synchronized with the associated backward compatible carrier, synchronization signals may be transmitted in an NCT cell. However, the density of a synchronization signal in the NCT cell may be relatively low. The density of a synchronization signal can refer to the proportion of resource elements that carry synchronization signals to the overall number of resource elements in the cell. If the density of a synchronization signal (PSS or SSS) in the NCT cell is greater than a density threshold, then the NCT cell can be used for timing reference. In contrast, if the density of a synchronization signal in the NCT cell is not greater than the density threshold, then the NCT cell cannot be used for timing reference.

Note that additional or alternative criteria can be specified for determining whether or not an NCT cell can be used as a timing reference cell. For example, another criterion can be that the NCT cell can be used for timing reference if the NCT cell and the associated backward compatible cell are not co-located in the same cell site, provided that the density of a synchronization signal exceeds the predefined threshold. An NCT cell and backward compatible cell are co-located if the antenna assembly for the NCT cell and the antenna assembly for the backward compatible cell are located generally at the same location. If the NCT cell and the associated backward compatible cell are co-located, then the NCT cell cannot be used as a timing reference cell.

A further issue relates to a determination of whether or not a cell, and in particular, an NCT cell, can be used as a pathloss reference cell. Pathloss can refer to an amount of loss experienced by a wireless signal communicated between a mobile device and a wireless access network node. A mobile device has to compensate for this pathloss when transmitting a signal on the uplink to the wireless access network node. Reference signals, such as the Common Reference Signal (CRS) or the Channel State Information Reference Signal (CSI-RS) transmitted by a wireless access network node in the pathloss reference cell can be used by the mobile device to determine the pathloss.

A mobile device measures a pathloss using a reference signal transmitted by the wireless access network node in the downlink in a given cell on a component carrier. Based on the measured pathloss, the mobile device can compensate for the pathloss when transmitting on the uplink in the given cell on the component carrier.

In accordance with some implementations, if certain criteria are not satisfied, an NCT cell on an NCT carrier should not be used as the pathloss reference cell.

For example, an NCT cell can be used for pathloss reference if the density of a reference signal (e.g. CRS or CSI-RS) in the NCT cell exceeds a density threshold. On the other hand, the NCT cell should not be used for pathloss reference if the density of a reference signal in the NCT cell does not exceed the density threshold. In further examples, an NCT cell should not be used for pathloss reference if the NCT carrier frequency is a higher frequency, e.g. above a frequency threshold (e.g. 3.5 GHz). On other hand, the NCT cell can be used for pathloss reference if the NCT carrier frequency is not above the frequency threshold. As yet another example, if the NCT cell and the associated backward compatible cell are not co-located in the same cell site, the NCT cell may be used as the pathloss reference cell, provided that the density of a reference signal exceeds a density threshold. However, if the NCT cell and the associated backward compatible cell are co-located in the same cell site, the NCT cell may not be used as the pathloss reference cell.

Figure 6:
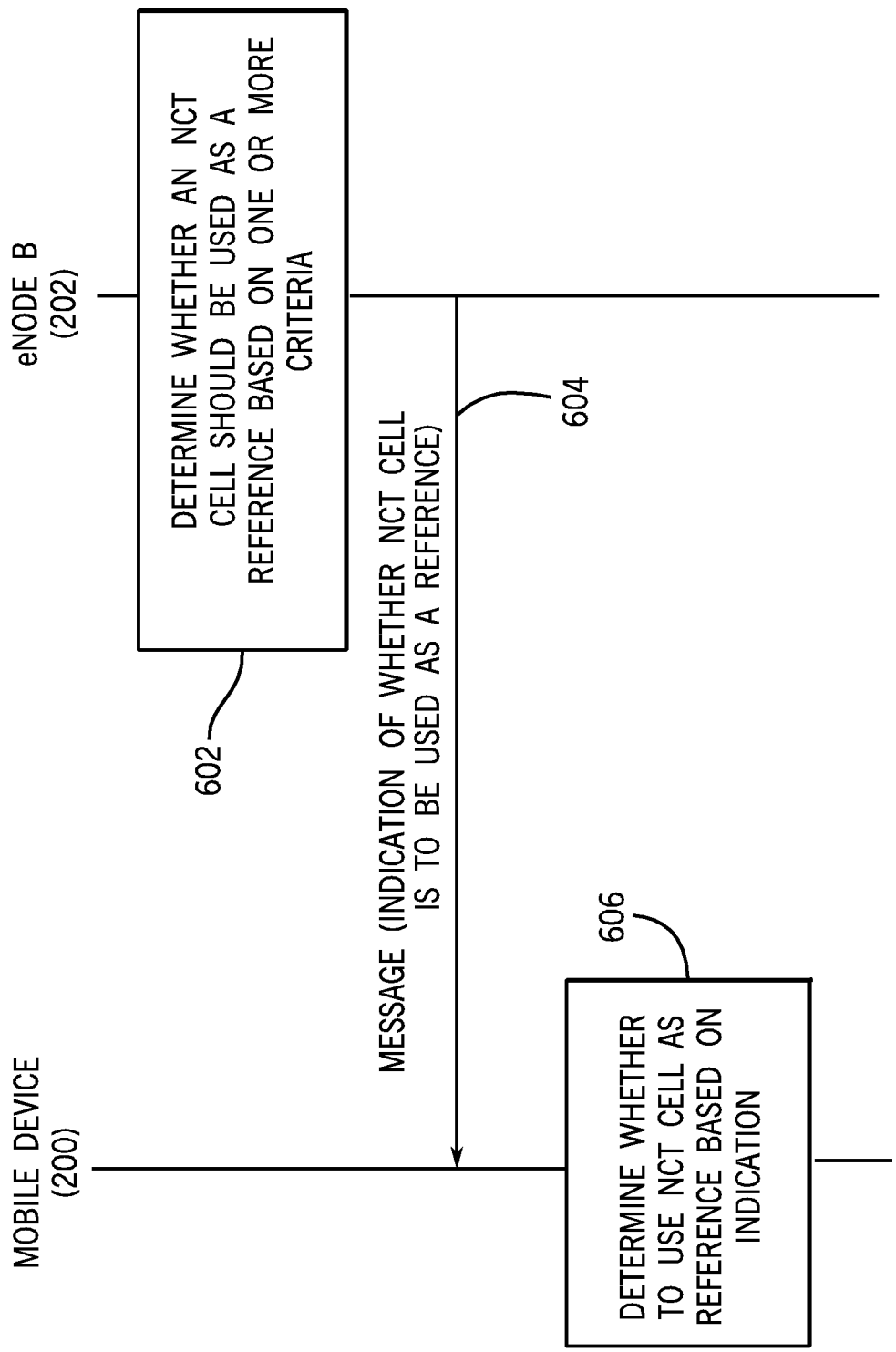
FIG. 6 is a message flow diagram of a process to control whether an NCT cell is to be used as a reference cell, in accordance with some implementations.

FIG. 6 is a message flow diagram of a control process to control whether or not to use an NCT cell as a reference. The wireless access network node 202 determines (at 602), based on one or more criteria (including those discussed above), whether an NCT cell should be used as a reference cell (timing reference cell, or pathloss reference cell, or both).

The wireless access network node 202 can send a message (at 604) to the mobile device 200, where the message contains an indication of whether or not an NCT cell is to be used as a reference cell. In some examples, the message can be in the form of system information, such as system information carried in an RRC message. In other examples, other types of messages can be used to carry the indication of whether or not an NCT cell is to be used as a reference cell. Note that the message containing the indication can be sent in a backward compatible cell associated with the NCT cell, in some implementations. In other implementations, the message containing the indication can be sent in the NCT cell.

Upon receiving the message sent at 604, the mobile device 200 determines (at 606), based on the indication received in the message sent at 604, whether or not to use an NCT cell as a reference cell.

Power Imbalance Handling

In the presence of both NCT and backward compatible carriers, power imbalance may occur between a cell on a backward compatible carrier and a cell on an NCT carrier. For example, a cell on the NCT carrier may have a relatively high power that may cause interference with neighboring cells, which can include a primary cell. Such interference may cause the mobile device to experience relatively poor radio link quality in the primary cell, and thus the mobile device can experience radio link failure in the primary cell.

Figure 7:
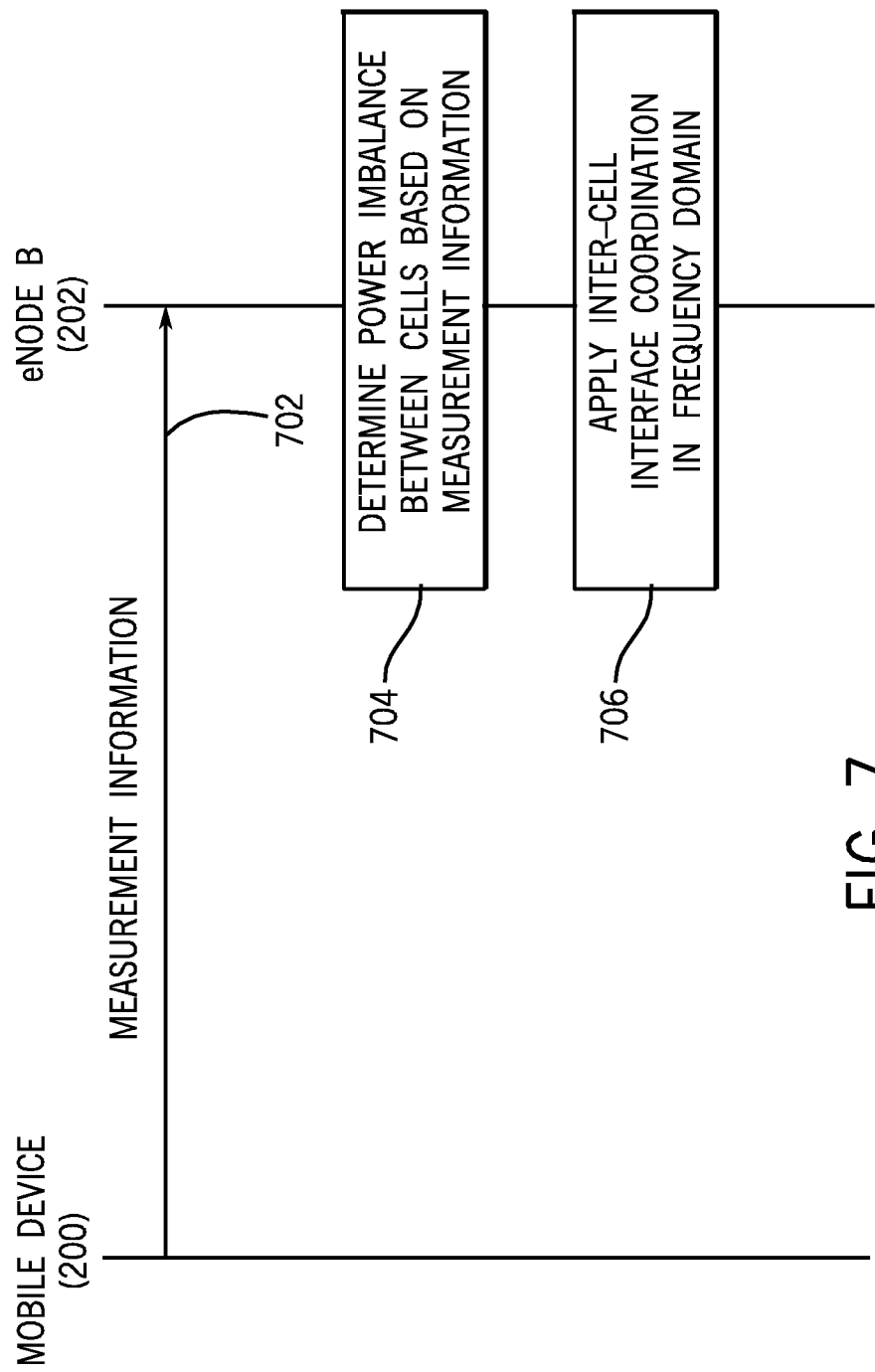
FIG. 7 is a message flow diagram of a process to perform power imbalance mitigation, in accordance with some implementations.

As shown in FIG. 7, the mobile device 200 can send (at 702) measurement information (such as in a measurement report) relating to various cells serving the mobile device. The measurement information is sent by the mobile device 200 to the wireless access network node 202. Based on the measurement report, the wireless access network node 202 can determine (at 704) presence of a power imbalance between a cell (e.g. primary cell) on a backward compatible carrier and a cell (e.g. secondary cell) on an NCT carrier. More specifically, for example, the measurement report may indicate that the primary cell may have a relatively poor radio link quality, while the secondary cell may have a relatively high receive power level. In alternative examples, instead of receiving a measurement report from the mobile device, the measurement information received by the wireless access network node 202 may include indications of frequent radio link failures in the primary cell (where "frequent" radio link failures refer to radio link failures within a predefined time window exceeding some predefined failure threshold). Upon detecting information regarding such frequent radio link failures possibly combined with the aforementioned measurement reports, the wireless network access node 202 may determine that a power imbalance exists.

In response to detecting the power imbalance, the wireless access network node 202 can apply (at 706) inter-cell interference coordination in a frequency domain, in accordance with some implementations. For example, reference signal(s) (e.g. CRS or CSI-RS) in a cell on the NCT carrier may be shifted away (by greater than some defined frequency distance or offset) from the frequency of the primary cell on a backward compatible carrier. In addition to, or instead of, shifting reference signal(s) away from the frequency of the primary cell, downlink control signaling in the primary cell may be carried in resource blocks that are away (by greater than some defined frequency distance or offset) from the frequency of the NCT carrier, such as by using an enhanced Physical Downlink Control Channel (EPDCCH) according to LTE Advanced.

The EPDCCH is used to perform downlink transmission of control signaling to a mobile device. The EPDCCH differs from the legacy PDCCH in that the EPDCCH does not occupy the full frequency bandwidth of a given carrier. As a result, the EPDCCH can be transmitted in selected resource blocks. On the other hand, the PDCCH is scattered across the full frequency bandwidth of a cell, such that it may be relatively difficult to perform interference coordination using the PDCCH. However, by using the EPDCCH, selected resource blocks within a particular frequency range that is a subset of the full frequency bandwidth of a backward compatible carrier may be used for transmitting downlink control signaling in the primary cell. The NCT cell may also utilize EPDCCH in such a way that resource blocks assigned to the EPDDCH is far apart from the primacy frequency carrier in order to reduce interference further.

Note that the resource blocks that can be selected to carry EPDCCH can be in any part of the bandwidth of the primary cell except the resource blocks assigned to EPDCCH to schedule data transmission to and from the mobile device.

More generally, to perform inter-cell interference coordination in the frequency domain, a control signal in one of an NCT cell or backward compatible cell can be shifted in frequency relative to a frequency of another NCT cell or backward compatible cell to have more space between interfering and victim carriers. As a result of being able to shift the frequency of the control signal in the NCT cell or the backward compatible cell, the wireless access network node 202 does not have to release an NCT cell on the NCT carrier or to change the primary cell from one backward compatible carrier to another backward compatible carrier, to avoid inter-cell interference.

In some cases, even by shifting the frequency of signals in an NCT cell or in the primary cell, the mobile device may still have difficulty receiving certain system information, such as System Information Block Type 1 or 2. In such cases, the system information of the primary cell can be transmitted from the wireless access network node 202 to the mobile device 200 using dedicated RRC messaging from the NCT cell or other secondary cell.

In general, according to some aspects, a network node receives information from a mobile device that is indicative of a power imbalance between cells on corresponding carriers of different types. In response to detecting the power imbalance, the network node shifts, in a frequency domain, a control signal in at least one of the cells to reduce the interference.

In some implementations, the signal that is shifted includes a reference signal in a cell on a carrier of a first type (e.g. an NCT carrier), where shifting of the reference signal includes shifting the reference signal away from a frequency of a cell on a carrier of a second, different type (e.g. backward compatible carrier).

In further implementations, the shifted signal can include a downlink control signal that is transmitted in selected resource elements in a frequency range of a cell on a carrier of the second type, where the frequency range is away from a frequency of the carrier of the first type.

In some implementations, the resource elements can be used to carry EPDCCH.

In further implementations, to reduce interference, system information can be communicated in a dedicated RRC messaging from cell (e.g. NCT cell or other secondary cell) on the carrier of the first type, to the mobile device.

In some implementations, the system information can include a Master Information Block, or a System Information Block Type 1 or 2.

DRX Configuration

A mobile device may employ Discontinuous Reception (DRX), in which the mobile device shuts off or places its receiver into a lower power state to conserve battery power during times when data transfer is not occurring (more specifically, during times when a wireless access network node is not transmitting data to the mobile device on the downlink).

Figure 8:
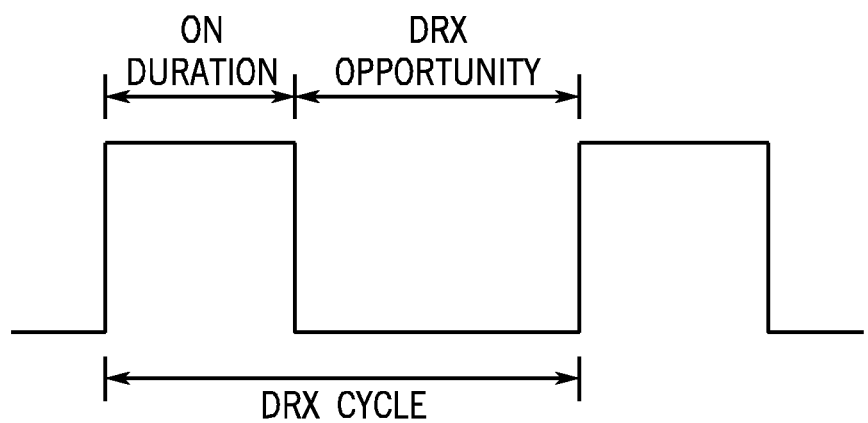
FIG. 8 is a timing diagram of a discontinuous reception (DRX) cycle.

FIG. 8 depicts a DRX cycle that has an ON duration (during which the receiver of the mobile device is active) and a DRX opportunity duration (during which the receiver of the mobile device may be deactivated). During the ON duration, the mobile device monitors for the Physical Downlink Control Channel (PDCCH) or enhanced PDCCH (EPDCCH), which carries downlink control information from the wireless access network node.

In a carrier aggregation that includes both NCT and backward compatible component carriers, a cell on the NCT carrier may support a much larger traffic volume as compared to a cell on a backward compatible carrier, due to the more efficient transmission technology and wider spectrum bandwidth available on the NCT carrier. As a result, there can potentially be a relatively large difference in traffic volume between an NCT cell and a backward compatible cell.

Traditionally, DRX may be common for all component carriers of a carrier aggregation. DRX being common for all component carriers of the carrier aggregation causes the DRX cycle depicted in FIG. 8 to be aligned across the component carriers. In a scenario where there is a relatively large traffic volume imbalance between cells on an NCT carrier and cells on a backward compatible carrier, use of a common DRX mechanism that is applied to all component carriers, including an NCT carrier, of a carrier aggregation may not be efficient.

In accordance with some implementations, to cope with imbalanced traffic in cells on different types of component carriers of a carrier aggregation, cell-specific DRX may be applied in a cell on an NCT carrier. In cell-specific DRX, the mobile device can be signaled the DRX configuration for a particular cell, such as the NCT cell. An NCT cell can be configured with a specific DRX configuration to save the mobile device's battery power. Full DRX operations may not have to be provided for this specific DRX configuration.

In accordance with some implementations, in addition to cell-specific DRX applied in an NCT cell, a mobile device-specific DRX can be applied in cells on backward compatible carriers of the carrier aggregation. Such mobile device-specific DRX is used by the mobile device when communicating with the cells on backward compatible carriers. The mobile device-specific DRX constitutes a common DRX that is applied in cells on the backward compatible carriers, which is distinct from the cell-specific DRX applied in the NCT cell on the NCT carrier. With the application of different DRX configurations in the NCT cell and the backward compatible cell(s), the mobile device can experience different active times (the ON duration depicted in FIG. 8 as extended by an inactivity timer or retransmission timer, discussed further below) in the NCT cell as compared to the backward compatible cell(s).

More generally, in accordance with some implementations, different DRX configurations can be applied to different types of component carriers of a carrier aggregation. A first DRX configuration is applied for the mobile device when communicating with a cell on an NCT carrier, while a second DRX configuration is applied for the mobile device when communicating with a cell on backward compatible carrier(s).

A DRX configuration can be defined by one or more parameters. For example, one such parameter is the ON duration of the DRX cycle, as depicted in FIG. 8. The ON duration of the DRX cycle is counted by an ON duration timer (e.g. onDurationTimer in LTE). Another parameter can be the duration of an inactivity timer, which is used to determine how long the receiver of a mobile device is to remain active after reception of a new data indication on PDCCH or EPDCCH. More specifically, the inactivity timer counts a specified number of PDCCH subframes after successfully decoding a PDCCH (or EPDCCH). The inactivity timer if active may cause the receiver of the mobile device to extend into the DRX opportunity duration of the DRX cycle in FIG. 8.

Another parameter of a DRX configuration can be a duration of a retransmission timer, which specifies a maximum number of PDCCH subframes in which retransmission of downlink data is to occur. Again, the retransmission timer can extend or cause the active time of the receiver of the mobile device, in this case to wait for downlink data retranmission.

The DRX configuration (which can be defined by the various parameters noted above in addition to other parameters) can be different between an NCT cell and a backward compatible cell.

In other examples, a DRX configuration can be defined by alternative parameters.

Figure 9:
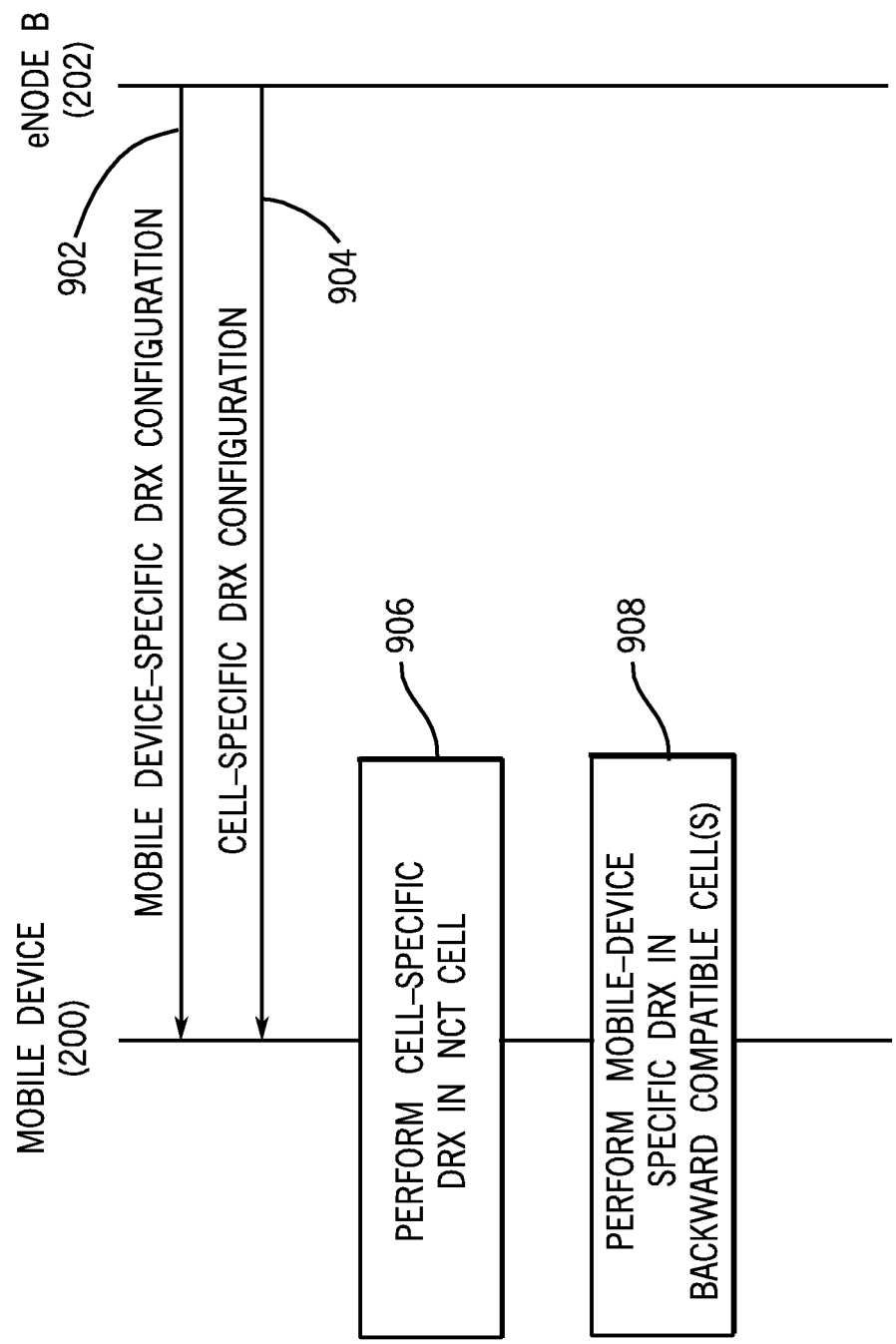
FIG. 9 is a message flow diagram of a DRX control process according to some implementations.

FIG. 9 is a message flow diagram of a process of controlling DRX configurations for the mobile device 200. The wireless access network node 202 can send (at 902) information pertaining to a mobile device-specific DRX configuration to the mobile device 200. Information pertaining to the mobile device-specific DRX configuration can be carried in an RRC message, such as the RRC Connection Reconfiguration message or the RRC Connection Setup message, in some examples. In other examples, other types of messages can be used to carry the mobile device-specific DRX configuration information sent at 902. The mobile device-specific DRX configuration specifies the DRX configuration to be used by the mobile device 200 when communicating on backward compatible carrier(s).

The wireless access network node 202 can also send (at 904) information pertaining to a cell-specific DRX configuration to the mobile device 200. In some examples, the cell-specific DRX configuration information can be contained in an information element of either of the RRC messages noted above, or in some other message. For example, one such information element can be the RadioResourceConfigDedicated information element for an NCT cell, which is used to specify the physical channel configuration for the mobile device. The cell-specific DRX configuration specifies the DRX configuration to be used by the mobile device 200 when communicating on an NCT carrier. An NCT cell may be configured as a secondary cell.

As further depicted in FIG. 9, the mobile device 200 (in response to the DRX configuration information received at 902 and 904) can perform cell-specific DRX in the NCT cell (at 906). Additionally, the mobile device 200 can perform (at 908) mobile-device specific configuration in the backward compatible cell(s).

In some examples, the information element RadioResourceConfigDedicated information element, noted above, that can be used to carry the cell-specific DRX configuration information can include the following:

mobile device in the cells on each of the NCT and backward compatible carriers, such that the mobile device can go into the sleep state.

Also, in some implementations, in response to the DRX MAC CE, the mobile device can use either a short or long DRX cycle on all component carriers (including the NCT carrier and backward compatible carrier(s)) of the carrier aggregation, depending on the DRX configuration of the respective component carrier. A long DRX cycle is a DRX cycle that has a longer off duration than a short DRX cycle.

Alternatively, a first DRX MAC CE can be sent in cells on component carriers in which mobile device-specific DRX is to be applied, and a second, separate DRX MAC CE can be sent in a cell on a component carrier in which cell-specific DRX is to be applied.

As noted above, the srs-transmission sub-field of the CellSpecificDRX-Config field can have either the "PCell" or "SCell" value. The srs-transmission sub-field controls whether transmission of certain uplink control information is during the active time of the primary cell (if the srs-transmission sub-field has the "PCell" value) or during the active time of the associated NCT cell (if the srs-transmission sub-field has the "Scell" value). The uplink control information that can be selectively sent during the active time of the primary cell or the active time of the associated NCT cell can include channel state information (CSI) or a sounding reference signal (SRS). The channel state information can refer to channel properties of a communication link, which can describe how a signal propagates from a transmitter (mobile device) to the receiver (wireless access

```
CellSpecfixDRX-Config-r11 ::= SEQUNECE {
    srs-transmission-r11        ENUMERATE {PCell, SCell}    OPTIONAL,
    common-DRX-MACCE            ENUMERATE {true}            OPTIONAK,
    drx-Config                  DRX-Config                  OPTIONAL
}
```

The CellSpecificDRX-Config field includes the cell-specific DRX configuration information for a secondary cell (e.g. NCT cell) on an NCT carrier.

The CellSpecific DRX-Config field includes the following sub-fields: srs-transmission (which can be assigned either the "PCell" or "SCell" value, which is described further below), common-DRX-MACCE (which if assigned to the "true" value indicates that a DRX Command MAC control element, referred to as "DRX MAC CE," causes the mobile device to perform a common DRX operation in response to the DRX MAC CE), and drx-Config (which specifies the DRX configuration, which can include various parameters such as those discussed above, including the durations of the ON duration timer, inactivity timer, retransmission timer, and other parameters).

A MAC (Medium Access Control) CE is a command that is sent by the MAC layer of wireless communications nodes (including the mobile device 200 and the wireless access network node 202). In an example where the sub-field common-DRX-MACCE of the CellSpecificDRX-Config field is assigned to the "true" value, the DRX MAC CE would cause the mobile device to perform a common DRX operation across all of the component carriers of a carrier aggregation.

For example, the DRX MAC CE may specify that the mobile device is to go to a reduced power state, such as a sleep state. In response to such a DRX MAC CE, the mobile device stops its ON duration timer and its inactivity timer. This has the effect of suspending the active time of the network node). The channel state information can represent the effect of any or some combination of the following: scattering, fading, and power decay with distance. The channel state information makes it possible to adapt transmissions to current channel conditions.

The SRS is transmitted on the uplink from the mobile device 200 to the wireless access network node 202, and allows the wireless access network node 202 to estimate the quality of a wireless uplink at different frequencies.

In some examples, other types of uplink control signals, such as CQI (Channel Quality Indicator), PMI (Precoding Matrix Index), RI (Rank Indicator), and PTI (Precoding Type Indicator), can be sent only during the active time of the primary cell. However, in alternative examples, some or all of these other uplink control signals can also be selectively sent in the active time of the primary cell or the associated NCT cell.

In general, according to some aspects, a wireless access network node sends information relating to a cell-specific DRX configuration to be used by a mobile device in a cell on a first component carrier of a first type in a carrier aggregation, where the cell-specific DRX configuration is not to be used for another component carrier of a second, different type in the carrier aggregation.

In some implementations, the wireless access network node can also send information relating to a mobile device-specific DRX configuration to be used by the mobile device in cells of the component carrier of the second type.

In some implementations, a mobile device receives a DRX command, and in response to the DRX command, the mobile device performs a specified DRX operation in cells of the component carriers of both the first and second types.

In some implementations, the wireless access network node can send an indication to specify whether an uplink control information is to be sent during an active time of a primary cell on a component carrier of the second type, or an active time of a cell on a component carrier of the first type.

As noted above, communications between a mobile device and a wireless access network node can be carried in subframes, where each subframe can include a number of time slots. A mode of data communication can be based on time-division duplexing (TDD), where a frequency bandwidth can be shared between the uplink and downlink between a mobile device and a wireless access network node. With TDD operation, a first number of subframes can be specified for uplink communications, and a second number of subframes can be specified for downlink communications.

Figure 10:
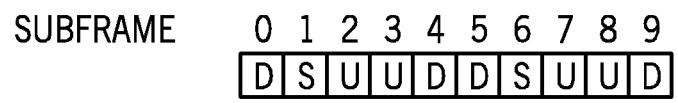
FIG. 10 illustrates an uplink-downlink configuration that includes downlink subframes, uplink subframes, and special subframes.

FIG. 10 depicts a number of subframes configured according to a specific uplink-downlink configuration. The subframes of FIG. 10 are part of a half-frame (a frame can include two half-frames, as shown in FIG. 4B discussed above). A "D" subframe is a downlink subframe to carry downlink information, while a "U" subframe is an uplink subframe to carry uplink information. In addition, an "S" subframe is a special subframe that can be provided between a "U" subframe and a "D" subframe. Although a specific uplink-downlink configuration is shown in FIG. 10, in other examples, other uplink-downlink configurations can be employed, which use different combinations of "D," "U," and "S" subframes.

Figure 11:
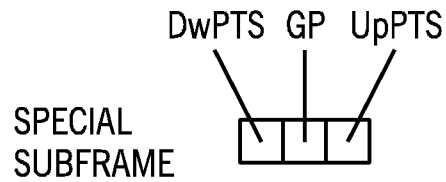
FIG. 11 illustrates portions of a special subframe.

As depicted in FIG. 11, a special subframe contains a portion of downlink transmission at the start of the subframe (the Downlink Pilot Time Slot, DwPTS), a portion of unused symbols in the middle of the subframe (the guard period, GP), and a portion of uplink transmission at the end of the subframe (the Uplink Pilot Time Slot, UpPTS).

Different uplink-downlink configurations may specify different lengths for the DwPTS of the special subframe. As provided in 3GPP TS 36.211, uplink-downlink configurations with relatively short DwPTS include the following: uplink-downlink configurations 0 and 5 with normal downlink cyclic prefix (CP), and uplink-downlink configurations 0 and 4 with extended downlink CP.

PDCCH is of sufficiently short length (one to three or four symbols, for example) such that PDCCH may be carried in the relatively short DwPTS in the foregoing example uplink-downlink configurations. However, the short DwPTS may not be long enough to carry EPDCCH, and thus EPDCCH would not be carried in a special subframe with the short DwPTS. As a result, in an NCT cell or backward compatible cell in which EPDCCH (but not PDCCH) is used for carrying downlink control information, DRX operation may not operate correctly when uplink-downlink configurations (such as those listed above) with short DwPTS are used.

Referring again to FIG. 8, a DRX cycle has an ON duration and a DRX opportunity duration during which the receiver of the mobile device may be deactivated. Note that if certain conditions are met, the receiver of the mobile device may be maintained in an active state for at least a portion of the DRX opportunity duration.

As noted above, the ON duration of the DRX cycle is counted by an on duration timer (e.g. onDurationTimer in LTE). The on duration timer counts each of a "D" subframe and an "S" subframe (such as those depicted in FIG. 10). After counting a specified number of such subframes (where the specified number can be configured by the network), the on duration timer expires, which indicates the end of the ON duration of the DRX cycle. The on duration timer counts a special subframe based on the assumption that the special subframe carries PDCCH or EPDDCH in the DwPTS of the special subframe.

However, the foregoing assumption would be incorrect in a cell that is configured to use EPDCCH (but not PDCCH) and in which one of the uplink-downlink configurations with reduced DwPTS length is used. In such uplink-downlink configurations, the DwPTS of the special subframe is too short to carry EPDCCH. If the on duration counter were to count a special subframe, then that would mean that the mobile device would have less opportunity to receive the EPDCCH that is carried in the "D" subframe. This effectively shortens the ON duration, since the on duration timer is counting a subframe (the special subframe) as being one that carries EPDCCH even though the subframe does not. Stated differently, the on duration timer is designed to count PDCCH subframes (those subframes that carry PDCCH or EPDCCH), and after counting a specified number of such subframes, the on duration timer expires to end the ON duration. However, if improperly designed, in cases where certain uplink-downlink configurations with short DwPTS are used, the on duration timer may be incorrectly counting special subframes as PDCCH subframes, regardless of whether the special subframes are carrying EPDCCH or not.

Figure 12:
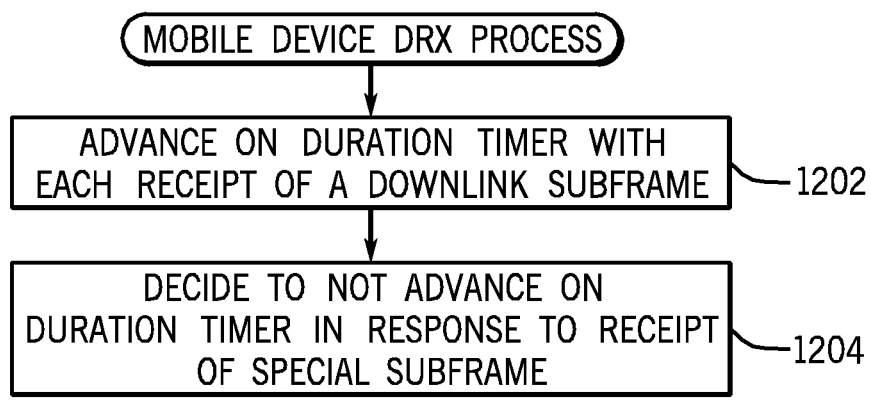
FIG. 12 is a flow diagram of a process at a mobile device relating to a DRX timer, in accordance with some implementations.

In some implementations, to address the foregoing issue, the mobile device may consider the special subframe as not a PDCCH subframe in DRX operation. FIG. 12 depicts an example DRX process performed by the mobile device. It is assumed that the DRX process is in a cell that is configured to communicate EPDCCH (but not PDCCH) and in which a uplink-downlink configuration with short DwPTS is used (such that the DwPTS is not long enough to carry EPDCCH). The mobile device advances (at 1202) the on duration timer with each receipt of a downlink or "D" subframe, since such subframe contains EPDCCH. Advancing the on duration timer refers to incrementing or decrementing the on duration timer (depending upon the design of the on duration timer). In accordance with some implementations, the mobile device decides (at 1202) to not advance the on duration timer in response to receipt of a special subframe, since the special subframe does not contain EPDCCH.

In alternative implementations, the network may configure the on duration timer with a longer length. In other words, the on duration timer is configured to expire after counting a larger number of PDCCH subframes.

Figure 13:
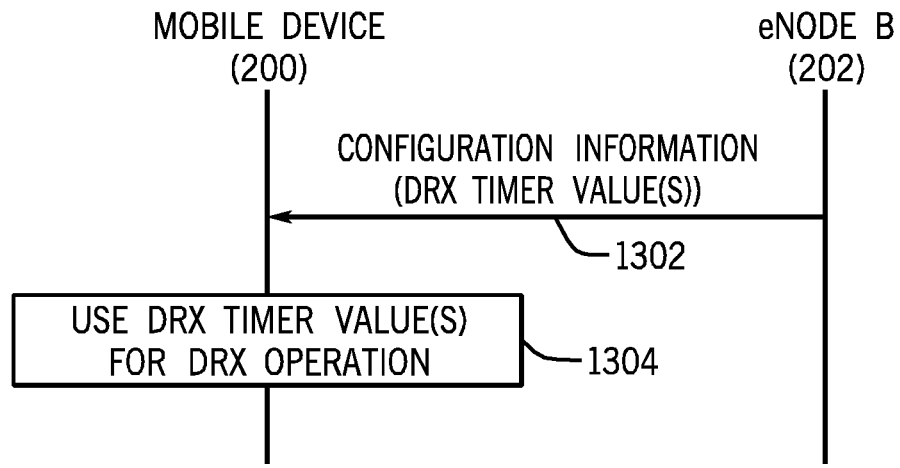
FIG. 13 is a message flow diagram of a process to provide a mobile device with DRX timer values, in accordance with some implementations.

As depicted in FIG. 13, the wireless access network node 202 may transmit (at 1302) configuration information to the mobile device 200, where the configuration information includes DRX timer value(s). An on duration timer value would specify the number of counts of PDCCH subframes (including downlink subframes and special subframes) before the on duration timer expires. In a cell that uses EPDCCH and a uplink-downlink configuration with short DwPTS (which is too short to carry EPDCCH), the configured on duration timer value is greater than in a cell that uses PDCCH or that uses EPDCCH but a uplink-downlink configuration with a longer DwPTS (which is long enough to carry EPDCCH).

The mobile device 200 uses (at 1304) the DRX timer value(s), including the increased on duration timer value, from the wireless access node 202 for DRX operation.

Although reference is made to solutions relating to the on duration timer for DRX operation in a cell configured to use EPDCCH (but not PDCCH) and to use a uplink-downlink configuration with shortened DwPTS, it is noted that similar solutions can be extended for other DRX timers, including an inactivity timer (e.g. drx-InactivityTimer in LTE) or a retransmission timer (e.g. drx-RetransmissionTimer in LTE).

The inactivity timer is used to determine how long the receiver of the mobile device is to remain active after reception of a new data indication on PDCCH or EPDCCH. More specifically, the inactivity timer counts a specified number of consecutive PDCCH subframes after successfully decoding a PDCCH (or EPDCCH). The inactivity timer if active may cause the receiver of the mobile device to extend into the DRX opportunity duration of the DRX cycle in FIG. 8. To address the issue of the inactivity counter incorrectly considering a special subframe as carrying EPDCCH when the special subframe cannot, either the FIG. 12 solution (disregard a special subframe when advancing the inactivity timer) or FIG. 13 solution (increase the signaled value of the inactivity timer) can be applied to the inactivity timer.

The retransmission timer specifies a maximum number of PDCCH subframes in which retransmission of downlink data is to occur. Again, the retransmission timer can extend the active state of the receiver of the mobile device, in this case to wait for downlink data retransmission. To address the issue of the retransmission counter incorrectly considering a special subframe as carrying EPDCCH when the special subframe cannot, either the FIG. 12 solution (disregard a special subframe when advancing the retransmission timer) or FIG. 13 solution (increase the signaled value of the retransmission timer) can be applied.

As yet another alternative, instead of the wireless network node 202 signaling a longer DRX timer value (on duration timer value, inactivity timer value, or retransmission timer value), the mobile device itself may compute an adjusted DRX timer value (that is longer than the corresponding DRX timer value signaled by the wireless access network node 202). The following equation illustrates an example computation of an adjusted DRX timer value:

Adjusted timer value=floor or ceiling {original timer value*(1+$nS/nD$)}, where the original timer value is a signaled value of the on duration timer, inactivity timer, or retransmission timer, and the parameters nS and nD are the number of special subframes and downlink subframes per frame, respectively. The floor or ceiling operator rounds down or up the computed value to provide an integer.

In sum, in some aspects, a method comprises advancing a DRX timer in response to receipt of a downlink subframe, and deciding to not advance the DRX timer in response to receipt of a special subframe.

In further aspects, a wireless access network node sends configuration information containing a DRX timer value that is increased to account for a particular uplink-downlink configuration in which a downlink portion of a special subframe is too short to carry a control channel.

In alternative aspects, a mobile device receives a DRX timer value from a wireless access network node, and computes an adjusted DRX timer value, based on the received DRX timer value and frame format, to use for DRX operation.

Control Channel Handling

A cell may carry both enhanced control channels as well as legacy control channels. A legacy control channel refers to a control channel defined by an earlier release of a wireless access protocol, while an enhanced control channel refers to a control channel defined by a later release of the wireless access protocol.

In some examples, enhanced control channels can include the enhanced Physical Downlink Control Channel (EPDCCH) (for example, for carrying downlink control signals), an enhanced Physical Control Format Indicator Channel (EPCFICH) (for example, for informing the mobile device about the number of OFDM symbols used to carry the EPDCCH), and an enhanced Physical Hybrid ARQ Indicator Channel (EPHICH) (for example, for reporting a hybrid ARQ status).

The foregoing example enhanced control channels may coexist with corresponding legacy control channels, including PDCCH, PCFICH, and PHICH. Although reference is made to specific legacy and enhanced control channels in this discussion, it is noted that other types of control channels can be used in other implementations.

Without knowing how to perform a search for both legacy and enhanced control channels, a mobile device may have to perform excessive blind decoding to find the legacy and enhanced control channels in a cell. Blind decoding refers to decoding of a possible combination of the number of resource elements, the size of payload and other configurable parameters to determine if there is control information that is being transmitted to the mobile device. Such blind decoding, particularly to search for both legacy and enhanced control channels, may result in increased processing at the mobile device, which can lead to increased battery usage and increased processing power.

Additionally, it is possible for the mobile device to miss control information carried in an enhanced control channel, if the blind decoding does not successfully identify the enhanced control channel.

In accordance with some implementations, techniques or mechanisms are provided to provide control channel configuration information to the mobile device, such that a mobile device can more efficiently and reliably detect legacy and/or enhanced control channels in a cell.

Figure 14:
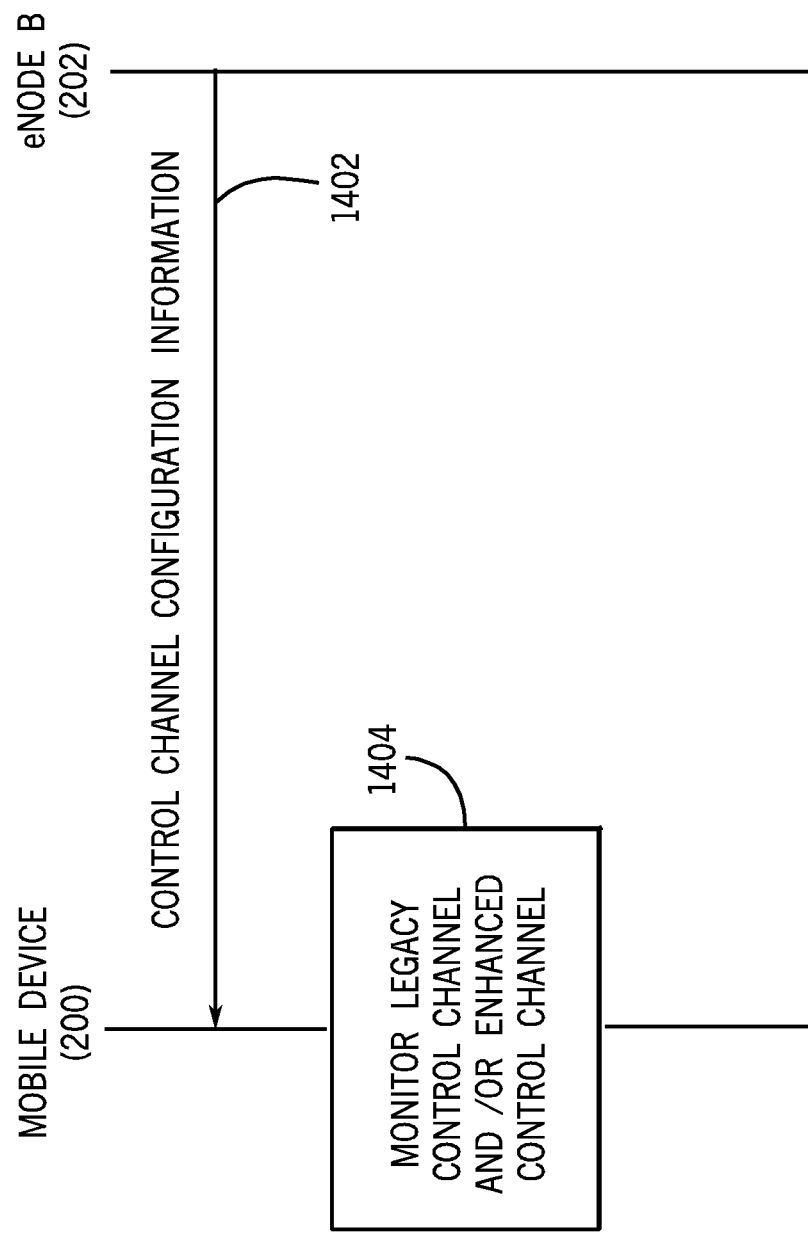
FIG. 14 is a message flow diagram of a channel configuration process according to some implementations.

As depicted in FIG. 14, the wireless access network node 202 can send (at 1402) information to the mobile device 200 to indicate the configuration of control channels. The control channel configuration information can indicate whether the mobile device should monitor a legacy control channel only (e.g. PDCCH), an enhanced control channel only (e.g. EPDCCH), or both the legacy and enhanced control channels (e.g. PDCCH and EPDCCH).

In response to the control channel configuration information sent at 1402, the mobile device 200 can perform (at 1404) monitoring of a legacy control channel and/or enhanced control channel, based on whether the information indicates that the mobile device 200 should monitor the legacy control channel only, the enhanced control channel only, or both the legacy control channel and enhanced control channel.

In some examples, if the mobile device 200 is to monitor PDCCH only, then normal blind decoding of PDCCH can be performed in a cell. However, if the mobile device 200 is to monitor EPDCCH only on a carrier, then the mobile device 200 can blind decode EPDCCH in a mobile device-specific search space in a given cell (e.g. NCT cell), while the mobile device 200 can rely on blind decoding PDCCH in a common search space on another serving cell (e.g. primary cell). The mobile device-specific search space refers to a combination of resource elements in the given cell that contains dedicated control information for a particular mobile device. The configuration parameters of the mobile device-specific search space are signaled to the UE by the network. A common search space refers to a combination of resource elements that contains system information applicable for all mobile devices served by a given cell.

When the mobile device is to monitor both the PDCCH and EPDCCH, the mobile device can search the PDCCH common search space and search the mobile-device-specific EPDCCH search space in a given cell.

The control channel configuration information of an NCT cell may be included in a secondary cell configuration information element in an RRC connection reconfiguration message, or in another message. An example secondary cell configuration information element that can be used is the PhysicalConfigDedicated information element. This information element can be extended to include the following fields:

| pdcch-Config-r11 | ENUMERATE {true} | OPTIONAL, |
| epdcch-Config-r11 | EPDCCH-Config-r11 | OPTIONAL |

The pdcch-Config field can be set to the "true" value to indicate that PDCCH is configured in the NCT cell. The epdcch-Config field indicates the EPDCCH configuration and the blind decoding search space for EPDCCH in the NCT cell.

Although the foregoing refers to configuration information that configures PDCCH and EPDCCH, it is noted that similar techniques can be applied to configure other types of control channels, including PCFICH, EPCFICH, PHICH, and EPHICH. Generally, when both a legacy control channel and its corresponding enhanced control channel are configured, their use may be indicated in the configuration information. For example, as noted above, if both PDCCH and EPDCCH are configured, the wireless access network node 202 can indicate that the mobile device 200 may blind decode the common search space of PDCCH and the mobile device-specific search space of EPDCCH, both in the same cell.

Another issue that may be encountered relates to presence of cross-carrier scheduling when applied to an NCT cell. Cross-carrier scheduling refers to scheduling in the context of a carrier aggregation that has at least two component carriers, such as component carriers A and B. With cross-carrier scheduling, control signals in a cell on carrier A can be used to control data transmissions in a cell on carrier B.

When cross-carrier scheduling is applied to a carrier aggregation that includes both NCT carriers and backward compatible carriers, the wireless access network node 202 may indicate, using messaging in a backward compatible cell, to the mobile device 200 whether or not a particular control region (e.g. EPDCCH region) exists in an NCT cell. If the NCT cell is indicated as not containing the particular control region, then the mobile device 200 can skip attempting to decode the control region in the NCT cell.

If the control region (e.g. EPDCCH region) exists in an NCT cell, a backward compatible cell may have to signal the detailed EPDCCH configuration (such as allocated radio bearers, allocated OFDM symbols, etc.) for the NCT cell, to the mobile device 200. If the NCT is only cross-carried scheduled (the NCT cell does not include a control region), the configuration information may not have to be provided.

A further issue relates to use of semi-persistent scheduling (SPS). A wireless access network node can allocate physical layer resources for both uplink and downlink shared channels. With normal scheduling, control channel signaling is provided with each allocation of physical layer resources by the wireless access network node. However, for certain applications, it may be inefficient to provide control channel signaling with each allocation of physical layer resources. As an example, one such application is a voice-over-IP (Internet Protocol) service, where voice or other audio is carried in IP packets over a data network. A VoIP session is characterized by bursty traffic, where a first speaker talks while a second speaker remains silent, and vice versa. The voice traffic can be carried in frames that arrive at regular intervals, particularly during the time when a speaker is talking. For example, a frame carrying voice traffic can occur every 10 to 20 milliseconds. If control channel signaling were to be provided for each frame, excessive control traffic may occur on a control channel.

To avoid having to provide control channel signaling with each frame, SPS can be used. SPS allows an ongoing allocation of physical layer resources to persist until the allocation is changed.

In some implementations, SPS can be configured in NCT cells as well as backward compatible cells. In some examples, activation or deactivation of SPS can be accomplished using SPS activation/deactivation signaling (e.g. SPS activation/deactivation PDCCH signaling).

The control channel configuration information sent at 1402 in FIG. 14 can specify whether or not SPS can be configured in an NCT cell, and if so, how activation or deactivation of the SPS is to be signaled. The control channel configuration information can specify that SPS activation/deactivation signaling can be provided from the NCT cell, or alternatively, from the associated backward compatible cell. The control channel configuration information can also include an SPS configuration to be used in the NCT cell.

If cross-carrier scheduling is used (e.g. the SPS activation/deactivation signaling from a backward compatible cell can be used to perform SPS activation/deactivation in an NCT cell), then a cell index may be included in the SPS activation/deactivation signaling. The cell index identifies the cell within a carrier aggregation to which the SPS activation/deactivation is to be performed. In some examples, SPS may be only configured in a particular NCT cell, for example, a voice only NCT cell. In this case, the cell index may not be needed.

The cell index can be carried in a carrier indicator field of DCI format 0, 1/1A, 2/2A/2B/2C. Alternatively, the cell index can be carried in different fields of the DCI formats listed above. In other examples, the cell index can be carried in high layer signaling if the SPS is semi-statically configured.

In general, according to some aspects, a wireless access network node can provide configuration information regarding selective ones of enhanced and legacy control channels to decode.

In some implementations, the configuration information can indicate that the mobile device is to decode a legacy control channel only, or to decode an enhanced control channel only, or both.

In general, according to some aspects, semi-persistent scheduling (SPS) can be activated in an NCT cell.

In some implementations, configuration information can be provided to indicate whether SPS can be configured in an NCT cell. The configuration information can also indicate how SPS in an NCT cell is to be activated or deactivated.

In some implementations, a cell index can be included signaling to activate or deactivate SPS in an NCT cell.

NCT Cell Configuration, Activation, and Deactivation

As explained above, a carrier aggregation includes a number of component carriers. One of the component carriers can be used as a primary carrier on which a primary cell is provided, while another component carrier can be used as a secondary carrier on which a secondary cell is provided. An NCT carrier is not to be used as a primary carrier, but can be used as a secondary carrier.

The configuration of the carrier aggregation for a mobile device may be modified by the network. For example, a secondary cell may be configured (added to the carrier aggregation) or released (removed from the carrier aggregation). Configuring a secondary cell involves adding a corresponding component carrier to the carrier aggregation. Releasing a secondary cell involves releasing a corresponding component carrier from the carrier aggregation. The secondary cell that may be configured or released may be an NCT cell. Also, once a secondary cell is configured, the secondary cell can be activated for use, such as in response to a command. This command can be a Medium Access Control (MAC) control element in some examples. A secondary cell may also be deactivated in response to a corresponding command, such as a MAC control element.

Configuring a secondary cell in a carrier aggregation may lead the mobile device to perform radio frequency (RF) retuning, in which the RF circuitry is retuned to operate with the corresponding additional component carrier. RF retuning can be performed in cases where the secondary cell being configured is on a component carrier that is in the same frequency band as the primary carrier. For example, adding an NCT carrier to the carrier aggregation increases the overall frequency bandwidth by the bandwidth of the NCT carrier. As a result, the RF circuitry of the mobile device is retuned to communicate in the increased frequency bandwidth.

Upon secondary cell configuration or activation, there may be channel startup delay X before the mobile device can receive data on the secondary cell due to the RF retuning, where the delay can include the time for RF processing, automatic gain control (AGC)/frequency lock, timing acquisition, and so forth.

In addition, in the case of intra-band carrier aggregation (where an additional component carrier from the same frequency band is added to the carrier aggregation), the retuning performed by the mobile device in response to secondary cell configuration, release, activation, or deactivation may involve retuning of an RF local oscillator in the mobile device, which can lead to an interruption time (or glitch) during which PDCCH monitoring in the primary cell is impacted. This time duration of this glitch is represented as Y.

The values of X and Y may depend on mobile device's knowledge of timing and RSRP/RSSI in the configured, released, activated, or deactivated secondary cell, as well as on the density of reference signal symbols (symbols in which reference signals are carried) available in the target secondary cell.

An NCT cell may have a lower density of reference signal symbols. As a result, the X and Y values for the NCT cell may be greater than X and Y delay values in a backward compatible cell.

Figure 15:
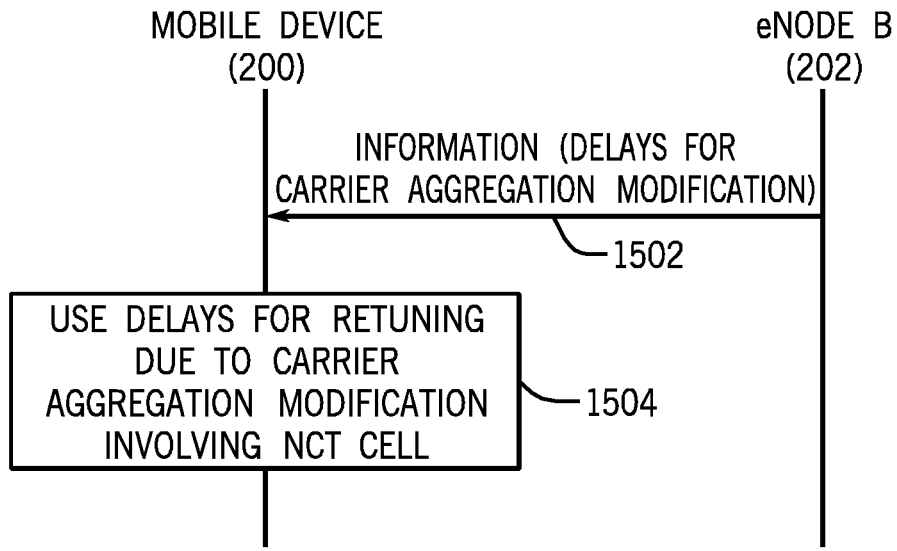
FIG. 15 is a message flow diagram of a process to provide a mobile device with delay values for carrier aggregation modification that involves an NCT cell, in accordance with some implementations.

In some implementations, as shown in FIG. 15, the increased X and Y delay values for an NCT cell can be sent (at 1502) from the wireless access network node 202 to the mobile device 200. The mobile device 200 uses (at 1504) the signaled X and Y values for retuning purposes in response to modification of a carrier aggregation, which can include configuration, release, activation, or deactivation of an NCT cell as a secondary cell. Note that configuration can include a scenario where one NCT carrier is being replaced with another NCT carrier.

In alternative implementations, instead of signaling the increased X and Y delay values from the wireless access network node 202, the increased X and Y delay values for an NCT cell can be predefined (preconfigured at the mobile device 200) or calculated at the mobile device 200. As examples, the calculation of the X and Y delay values may include calculating the X and Y values based on the density of reference signal symbols in the NCT cell. A lower density of reference signal symbols leads to increase computed X and Y values.

In sum, in some aspects, a method comprises determining, at a mobile device, a delay associated with a modification of a carrier aggregation, the modification relating to one of configuring, releasing, activating, or deactivating a new carrier type cell.

In some implementations, the delay can be due to RF retuning during which reliable reception of data by the mobile device is not possible.

In some implementations, the determining includes receiving information regarding the delay from a wireless access network node. In other implementations, the determining is based on preconfigured information regarding the delay at the mobile device. In further implementations, the determining includes calculating, at the mobile device, the delay based on a density of reference signal symbols.

In further aspects, a wireless access network node sends information to a mobile device pertaining to a delay relating to modification of a carrier aggregation, the modification relating to one of configuring, releasing, activating, or deactivating a new carrier type cell.

System Architecture

Figure 16:
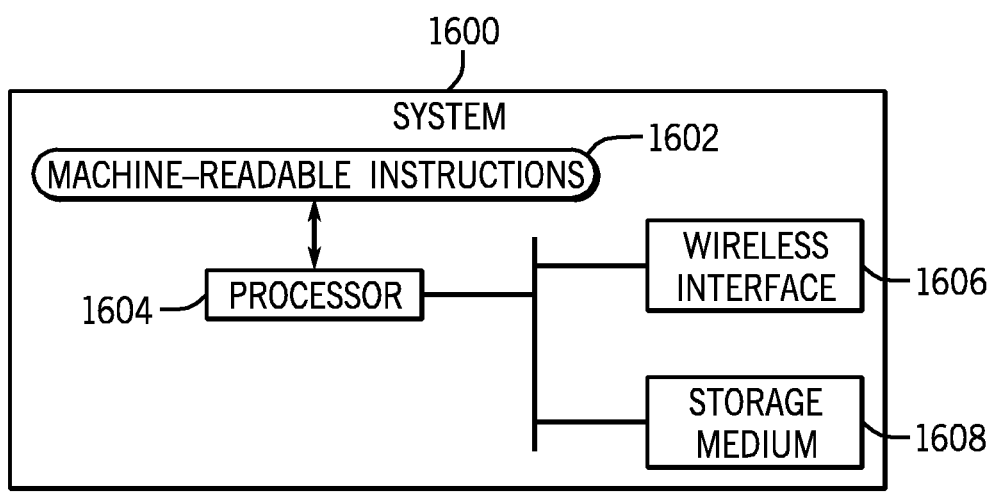
FIG. 16 is a block diagram of a system according to some implementations.

FIG. 16 depicts an example system 1600, which can be the mobile device 200 or the wireless access network node 202. The system 1600 includes machine-readable instructions 1602 executable on one or multiple processors 204. The system 1600 further includes a wireless interface 1604 to communicate over a wireless link, and a storage medium (or storage media) 1608 to store information.

A processor can include a microprocessor, microcontroller, processor module or subsystem, programmable integrated circuit, programmable gate array, or another control or computing device.

The storage medium (or storage media) 1608 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   determining, by a network node, whether a cell on a first carrier of a first type or a cell on a second carrier of a second, different type is to be used as a reference cell, wherein the first carrier and the second carrier are part of a carrier aggregation, and wherein the reference cell is at least one selected from among a pathloss reference cell and a timing reference cell;
   sending, by the network node to a mobile device, information indicating whether the cell on the first carrier of the first type or the cell on the second carrier of the second type is to be used as the reference cell; and
   sending, by the network node to the mobile device, configuration information regarding whether the mobile device is to connect with a cell on another carrier of a new carrier type.

2. The method of claim 1, wherein determining that the cell on the first carrier of the first type is not to be used as the timing reference cell is based on determining that the first carrier of the first type is synchronized with the second carrier of the second type.

3. The method of claim 1, wherein sending the information indicating whether the cell on the first carrier of the first type or the cell on the second carrier of the second type is to be used as the reference cell comprises sending the information in system information or a dedicated Radio Resource Control (RRC) message.

4. The method of claim 1, further comprising:
   sending, by the network node to the mobile device, information relating to a Discontinuous Reception (DRX) configuration that is specific to a type of carrier, wherein the sending of the DRX configuration comprises:
      sending information relating to a first DRX configuration for communications with the cell on the first carrier of the first type, and
      sending information relating to a second DRX configuration for communications with the cell on the another carrier of the new carrier type.

5. The method of claim 1, further comprising:
   sending, by the network node to the mobile device, configuration information specifying use of semi-persistent scheduling (SPS) in a cell on a carrier of a third type.

6. A mobile device comprising:
   at least one processor configured to:
      receive, from a network node, information indicating whether a cell on a first carrier of a first type or a cell on a second carrier of a second, different type is to be used as a reference cell, wherein the reference cell is at least one selected from among a pathloss reference cell and a timing reference cell, and wherein the first carrier and the second carrier are part of a carrier aggregation;
      determine, based on the information, whether the mobile device is able to use the cell on the first carrier as the reference cell;
      receive, from the network node, configuration information regarding whether the mobile device is to connect with a cell on another carrier of a new carrier type;
      receive information relating to a Discontinuous Reception (DRX) configuration that is specific to a type of carrier, wherein the information relating to the DRX configuration comprises:
         information relating to a first DRX configuration for communications with the cell on the first carrier of the first type, and
         information relating to a second DRX configuration for communications with the cell on the another carrier of the new carrier type.

7. The mobile device of claim 6, wherein the at least one processor is configured to further:
   receive information specifying use of semi-persistent scheduling (SPS) in the cell on the another carrier of the new carrier type.

8. The mobile device of claim 7, wherein the at least one processor is configured to further:
   use resources according to the received information specifying use of SPS.

9. The mobile device of claim 6, wherein the information indicating whether the cell on the first carrier of the first type or the cell on the second carrier of the second type is to be used as the reference cell comprises one of system information, and a dedicated Radio Resource Control (RRC) message.

10. A method comprising:
    determining, by a network node, whether a cell on a first carrier of a new carrier type is to be configured with a mobile device being served by a second carrier of a second type, wherein the second type carrier is a backward compatible carrier;
    sending, by the network node to the mobile device, configuration information of the cell of the first carrier of the new carrier type; and
    sending, by the network node to the mobile device, Discontinuous Reception (DRX) information relating to a DRX configuration that is specific to a type of carrier, wherein the sending of the DRX information comprises:
       sending information relating to a first DRX configuration for communications with the cell on the first carrier of the new carrier type, and
       sending information relating to a second DRX configuration for communications with the cell on the second carrier of the second type.

11. The method of claim 10, wherein the configuration information relates to a reference signal to be measured by the mobile device.

12. The method of claim 10, wherein the configuration information specifies use of semi-persistent scheduling (SPS) in the cell on the carrier of the new carrier type.

13. The method of claim 10, wherein the first carrier of the new carrier type and the second carrier of the second type are part of a carrier aggregation.

14. A network node comprising:
    at least one processor configured to:
       determine whether a cell on a first carrier of a new carrier type is to be configured with a mobile device served by a second carrier of a second type, wherein the second type carrier is a backward compatible carrier;
send, to the mobile device, configuration information of the cell on the first carrier of the new carrier type;
send, to the mobile device, Discontinuous Reception (DRX) information relating to a DRX configuration that is specific to a type of carrier, wherein the sending of the DRX information comprises:
sending information relating to a first DRX configuration for communications with the cell on the first carrier of the new carrier type, and
sending information relating to a second DRX configuration for communications with the cell on the second carrier of the second type.

15. The network node of claim 14, wherein the configuration information relates to a reference signal to be measured by the mobile device.

16. The network node of claim 14, wherein the configuration information specifies use of semi-persistent scheduling (SPS) in the cell on the carrier of the new carrier type.

17. The network node of claim 14, wherein the first carrier of the new carrier type and the second carrier of the second type are part of a carrier aggregation.

* * * * *